(12) United States Patent
MacKay et al.

(10) Patent No.: US 12,010,468 B2
(45) Date of Patent: Jun. 11, 2024

(54) UTILIZING AN INCREMENTAL NOISE METRIC FOR RAPID MODELING OF OPTICAL NETWORKS

(71) Applicant: Ciena Corporation, Hanover, MD (US)

(72) Inventors: Alex W. MacKay, Ottawa (CA); Fangyuan Zhang, Kanata (CA); David W. Boertjes, Nepean (CA); Andrew D. Shiner, Ottawa (CA)

(73) Assignee: Ciena Corporation, Hanover, MD (US)

( * ) Notice: Subject to any disclaimer, the term of this patent is extended or adjusted under 35 U.S.C. 154(b) by 87 days.

(21) Appl. No.: 17/914,856

(22) PCT Filed: Jul. 1, 2021

(86) PCT No.: PCT/US2021/040087
§ 371 (c)(1),
(2) Date: Sep. 27, 2022

(87) PCT Pub. No.: WO2022/006395
PCT Pub. Date: Jan. 6, 2022

(65) Prior Publication Data
US 2023/0146640 A1    May 11, 2023

Related U.S. Application Data

(60) Provisional application No. 63/047,457, filed on Jul. 2, 2020.

(51) Int. Cl.
*H04B 10/00* (2013.01)
*H04B 10/038* (2013.01)
(Continued)

(52) U.S. Cl.
CPC ....... *H04Q 11/0062* (2013.01); *H04B 10/038* (2013.01); *H04B 10/0795* (2013.01);
(Continued)

(58) Field of Classification Search
CPC ........... H04B 10/07953; H04J 14/0267; H04J 14/0268; H04J 14/0271; H04Q 2011/0073
See application file for complete search history.

(56) References Cited

U.S. PATENT DOCUMENTS

| 5,822,094 A | 10/1998 | O'Sullivan et al. |
| 6,064,501 A | 5/2000 | Roberts et al. |

(Continued)

FOREIGN PATENT DOCUMENTS

| EP | 2 493 102 A1 | 8/2012 |
| EP | 3 512 124 A1 | 7/2019 |

OTHER PUBLICATIONS

Christian Merkle, Degradation Model for Erbium-Doped Fiber Amplifiers to Reduce Network Downtime, 2010, p. 198-208, IFIP International Federation for Information Processing 2010.

(Continued)

*Primary Examiner* — Daniel G Dobson
(74) *Attorney, Agent, or Firm* — Baratta Law PLLC; Lawrence A. Baratta, Jr.

(57) ABSTRACT

Systems and methods include receiving (S11) data for a plurality of elements associated with an optical network; determining (S12) an incremental noise penalty for each element of the plurality of elements based on the received data; and storing (S13) the incremental noise penalty for each element of the plurality of elements. The steps can further include determining (S14) Signal-to-Noise Ratio (Continued)

(SNR) across an optical path in the optical network by concatenating associated incremental noise penalties for each element in the optical path along with corrections. The present disclosure includes a fast, nonlinear estimation process with improved accuracy for low loss spans compared to traditional closed-form GN models, as well as a method to determine the coherent nonlinear penalty in an arbitrary concatenation of mixed heterogeneous fibers which is not considered by existing fast nonlinear interference calculation methods.

20 Claims, 21 Drawing Sheets

(51) Int. Cl.
  *H04B 10/079* (2013.01)
  *H04Q 11/00* (2006.01)
  *H04J 14/00* (2006.01)
(52) U.S. Cl.
  CPC ............... *H04B 10/07953* (2013.01); *H04Q 2011/0081* (2013.01)

(56) References Cited

U.S. PATENT DOCUMENTS

| | | |
|---|---|---|
| 7,379,234 B2 | 5/2008 | Rapp |
| 2016/0191194 A1* | 6/2016 | Wood .................. H04J 14/0267 398/58 |
| 2023/0145196 A1* | 5/2023 | Ota ..................... H04J 14/0271 398/79 |

OTHER PUBLICATIONS

P. Poggiolini et al., "The LOGON Strategy for Low-Complexity Control Plane Implementation in New-Generation Flexible Networks," OFC/NFOEC Technical Digest, 2013, OW1H.3, Optical Society of America, pp. 1-3.

ip.com, "Rapid optical communication path viability determination enabled by simplified coherent nonlinear interference estimation," IPCOM000259020D, Jul. 3, 2019, pp. 1-9.

Oct. 15, 2021, International Search Report and Written Opinion for International Patent Application No. PCT/US2021/040087.

* cited by examiner

UTILIZING AN INCREMENTAL NOISE METRIC FOR RAPID MODELING OF OPTICAL NETWORKS

CROSS-REFERENCE TO RELATED APPLICATION(S)

The present disclosure is a national stage of PCT Application No. PCT/US2021/040087, filed on Jul. 1, 2021, and which claims priority to U.S. Provisional Patent Application No. 63/047,457, filed Jul. 2, 2020, and entitled "Utilizing an incremental noise metric for rapid modeling of optical networks," the contents of which are incorporated by reference in their entirety.

FIELD OF THE DISCLOSURE

The present disclosure generally relates to optical networks, More particularly, the present disclosure relates to systems and methods for utilizing an incremental noise metric for rapid modeling, such as determining a Signal-to-Noise Ratio (SNR), of optical networks, and for proactively detecting failures on restoration paths in an optical network and visualizations thereof.

BACKGROUND OF THE DISCLOSURE

To fully exploit the available capacity within an optical network and efficiently allocate network resources, a real-time tool to accurately estimate net system performance is needed. Additionally, for a plurality of use cases discussed herein, there is a need to determine the local performance across smaller subsets of the network or within arbitrary concatenations of fibers and network element objects within any given path within the network. One of the more challenging penalties to model quickly and accurately within the net system performance and as an incremental penalty is the nonlinear interference penalty due to Kerr nonlinearity within the optical fiber. The Gaussian Noise (GN) model has been proposed as a simple model for fiber nonlinearity estimation. This is described, for example, in [1] Poggiolini P.: 'The GN model of non-linear propagation in uncompensated coherent optical systems,' Journal of Lightwave Technology, 2012, 30, (24), pp 3857-79; [2] Poggiolini P, Bosco G, Carena A, et al.: 'The GN-model of fiber non-linear propagation and its applications,' Journal of Lightwave technology,' 2013, 32, (4), pp. 694-721; [3] Poggiolini P, Bosco G, Carena A, et al.: 'A detailed analytical derivation of the GN model of non-linear interference in coherent optical transmission systems,' arXiv preprint arXiv: 1209.0394, 2012; [4] Carena A, Bosco G, Curri V, et al.: 'EGN model of non-linear fiber propagation,' Optics express, 2014, 22, (13), pp. 16335-62; and [5] Zhang F, Zhuge Q, Plant D V.: Fast analytical evaluation of fiber nonlinear noise variance in mesh optical networks, IEEE/OSA Journal of Optical Communications and Networking, 2017, 9, (4), pp. C88-97, the contents of each are incorporated by reference herein.

In the literature, there are closed-form solutions for the Incoherent GN (IGN) model, which are sufficiently computationally efficient to allow real-time nonlinear estimation and can be used to give first order incremental performance across individual fibers within the network [1]. However, these simple closed-form solutions are based on an assumption of moderately high fiber loss spans, i.e., fiber losses greater than about 10 dB, and when these models are used for lower loss spans, the calculated Nonlinear Interference (NLI) is underestimated. To support arbitrary loss fiber spans, a more widely applicable method to solve the GN model integrals is required. In practice, there are a large number of fibers with low loss and short span length. FIG. 1 is a graph of fiber length probability distribution of an example optical network. Fibers with span lengths less than 40 km are approximately 30% of the total. Therefore, any fast estimation tool must provide accurate results for short, lower loss spans.

Additional shortcomings exist for published methods to calculate incremental penalties within the optical network, where they do not consider or correct for upstream noise sources or the coherent nonlinear interference generated by the concatenation of an arbitrary heterogeneous mix of fibers, see, e.g., P. Poggiolini et. al, "The LOGON Strategy for Low-Complexity Control Plane Implementation in New-Generation Flexible Networks," OFC 2013, OW1H.3, the contents of which are incorporated by reference herein.

BRIEF SUMMARY OF THE DISCLOSURE

The present disclosure relates to systems and methods for obtaining and utilizing an incremental noise metric for noise localization, performance-based routing, and rapid performance modeling including real-time viability monitoring based on metrics such as Signal-to-Noise Ratio (SNR), of optical networks. The present disclosure includes a fast, nonlinear estimation process with improved accuracy for low loss spans compared to traditional closed-form GN models, as well as a method to determine the coherent nonlinear penalty in an arbitrary concatenation of mixed heterogeneous fibers which is not considered by existing fast nonlinear interference calculation methods. This disclosure also includes methods to correct the concatenation of incremental penalties when calculated independently without knowledge of upstream noise sources, which is a general incremental penalty correction applicable to all incoherent noise sources.

In an embodiment, a non-transitory computer-readable storage medium includes computer readable code stored thereon for programming a processing device to perform steps of obtaining data for a plurality of elements associated with an optical network; determining an incremental noise penalty for each element of the plurality of elements; and storing the incremental noise penalty for each element of the plurality of elements. The steps can further include determining Signal-to-Noise Ratio (SNR) across an optical path in the optical network by concatenating associated incremental noise penalties for each element in the optical path along with corrections. The corrections can be for upstream incremental noise penalties for elements upstream from the associated element. The SNR can be determined in real-time based on utilizing stored incremental noise penalties. The SNR for the optical path can be utilized as a cost metric in path computation. The steps can further include utilizing the SNR for the optical path to determine if any of a pre-planned restoration route for an optical channel and a new route for a new optical channel is currently viable. The steps can further include identifying sections in the optical network that need maintenance or repair based on monitoring associated incremental noise penalties. The steps can further include periodically performing the obtaining, the determining, and the storing; and monitoring the associated incremental noise penalties over time.

In another embodiment, an apparatus includes one or more processors and memory storing instructions that, when executed, cause the one or more processors to obtain data for a plurality of elements associated with an optical network, determine an incremental noise penalty for each element of the plurality of elements, and store the incremental noise penalty for each element of the plurality of elements. The instructions that, when executed, can further cause the one or more processors to determine Signal-to-Noise Ratio (SNR) across an optical path in the optical network by concatenating associated incremental noise penalties for each element in the optical path along with corrections. The corrections can be for upstream incremental noise penalties for elements upstream from the associated element. The SNR can be determined in real-time based on the stored incremental noise penalties. The SNR for the optical path can be utilized as a cost metric in path computation. The instructions that, when executed, can further cause the one or more processors to utilize the SNR for the optical path to determine if any of a pre-planned restoration route for an optical channel and a new route for a new optical channel is currently viable. The instructions that, when executed, can further cause the one or more processors to identify sections in the optical network that need maintenance or repair based on monitoring associated incremental noise penalties.

In a further embodiment, a method includes obtaining data for a plurality of elements associated with an optical network; determining an incremental noise penalty for each element of the plurality of elements; and storing the incremental noise penalty for each element of the plurality of elements. The method can further include determining Signal-to-Noise Ratio (SNR) across an optical path in the optical network by concatenating associated incremental noise penalties for each element in the optical path along with corrections. The corrections can be for upstream incremental noise penalties for elements upstream from the associated element. The method can further include utilizing the SNR for the optical path to determine if any of a pre-planned restoration route for an optical channel and a new route for a new optical channel is currently viable. The method can further include identifying sections in the optical network that need maintenance or repair based on monitoring associated incremental noise penalties.

In yet another embodiment, a non-transitory computer-readable storage medium having computer readable code stored thereon for programming a processing device to perform steps of, responsive to obtaining measurement data from an optical network and determining viability of a plurality of paths based on Signal-to-Noise Ratio (SNR) and availability of the plurality of paths, providing a User Interface (UI) that displays one or more photonic services and a path viability visualization for each of the one or more photonic services, wherein the path viability visualization, for each photonic service, includes visual elements for available paths of the plurality of paths and an indicator associated with each visual element indicative of path viability; and updating the UI responsive to a change in any of the viability and the availability of the plurality of paths. The steps can further include periodically obtaining the measurement data from the optical network and determining the viability of the plurality of paths. The steps can further include providing a map view of all or part of the optical network, wherein the map view includes nodes and links interconnecting the nodes; and providing a visualization for each of the links based on a visual key, to indicate a level of the viability thereof. The steps can further include receiving a selection of a link; and displaying a summary of current measurement data associated with the link. The viability can be based on the SNR and whether margin is available thereon, and wherein the availability is based whether spectrum is available. The indicator associated with each visual element indicative of path viability can indicate any of viable, unavailable, current where the photonic service is using an associated path, and non-viable. The viability of the plurality of paths based on the SNR can utilize an incremental SNR computation. The available paths, for a photonic service, can include a home path and zero or more standby paths, with a number of visual elements indicating the number of the zero or more standby paths.

In yet another embodiment an apparatus includes a network interface and a processor communicatively coupled to one another; and memory with instructions that, when executed, cause the processor to, responsive to obtained measurement data from an optical network and determined viability of a plurality of paths based on Signal-to-Noise Ratio (SNR) and availability of the plurality of paths, provide a User Interface (UI) that displays one or more photonic services and a path viability visualization for each of the one or more photonic services, wherein the path viability visualization, for each photonic service, includes visual elements for available paths of the plurality of paths and an indicator associated with each visual element indicative of path viability; and update the UI responsive to a change in any of the viability and the availability of the plurality of paths. The instructions that, when executed, can further cause the processor to periodically obtain the measurement data from the optical network and determine the viability of the plurality of paths. The instructions that, when executed, can further cause the processor to provide a map view of all or part of the optical network, wherein the map view includes nodes and links interconnecting the nodes; and provide a visualization for each of the links based on a visual key, to indicate a level of the viability thereof. The instructions that, when executed, can further cause the processor to receive a selection of a link; and display a summary of current measurement data associated with the link. The viability can be based on the SNR and whether margin is available thereon, and wherein the availability can be based on whether spectrum is available. The indicator associated with each visual element indicative of path viability can indicate any of viable, unavailable, current where the photonic service is using an associated path, and non-viable. The viability of the plurality of paths based on the SNR can utilize an incremental SNR computation. The available paths, for a photonic service, can include a home path and zero or more standby paths, with a number of visual elements indicating the number of the zero or more standby paths.

In yet a further embodiment, a method includes, responsive to obtaining measurement data from an optical network and determining viability of a plurality of paths based on Signal-to-Noise Ratio (SNR) and availability of the plurality of paths, providing a User Interface (UI) that displays one or more photonic services and a path viability visualization for each of the one or more photonic services, wherein the path viability visualization, for each photonic service, includes visual elements for available paths of the plurality of paths and an indicator associated with each visual element indicative of path viability; and updating the UI responsive to a change in any of the viability and the availability of the plurality of paths. The method can further include periodically obtaining the measurement data from the optical network and determining the viability of the plurality of paths. The method can further include providing a map view of all or part of the optical network, wherein the map view includes nodes and links interconnecting the nodes; and providing a visualization for each of the links based on a visual key, to indicate a level of the viability thereof. The method can further include receiving a selection of a link; and displaying a summary of current measurement data associated with the link.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
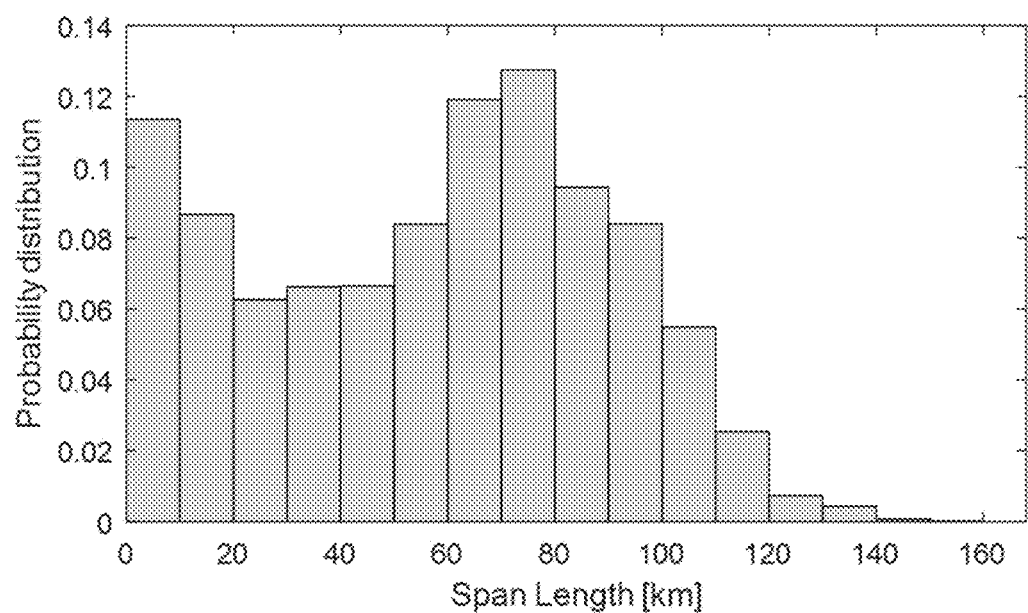
FIG. 1 is a graph of fiber length probability distribution of an example optical network.

Again, the present disclosure relates to systems and methods for obtaining and utilizing an incremental noise metric for noise localization, performance-based routing, and rapid performance modeling including real-time viability monitoring based on metrics such as Signal-to-Noise Ratio (SNR), of optical networks. The present disclosure includes a fast, nonlinear estimation process with improved accuracy for low loss spans compared to traditional closed-form GN models, as well as a method to determine the coherent nonlinear penalty in an arbitrary concatenation of mixed heterogeneous fibers which is not considered by existing fast nonlinear interference calculation methods. This disclosure also includes methods to correct the concatenation of incremental penalties when calculated independently without knowledge of upstream noise sources, which is a general incremental penalty correction applicable to all incoherent noise sources.

§ 1.0 Incremental SNR and NSR

The metric that dictates the capacity of a channel is the Signal-to-Noise Ratio (SNR), where the maximum capacity achievable is given by the Shannon-Hartley theorem. The present disclosure proposes the use of incremental SNR (or equivalently the inverse of SNR, namely the Noise-to-Signal Ratio (NSR)) as a pre-computed and stored metric to characterize elements of an operating optical network, which can be consumed for various uses. In linear units, there is a reciprocal relationship between the NSR and the SNR and that knowledge of one is sufficient to define the other. For any element in an optical path (e.g., fiber, an Erbium-Doped Fiber Amplifier (EDFA), etc.), it is possible to describe the incremental penalty of that object by an incremental NSR at a given frequency, in a given state by:

$$\Delta NSR(v) \equiv NSR_{out}(v) - NSR_{in}(v) = \frac{\Delta N(v)}{S_{out}(v)} \quad (1.1)$$

Where:

The state of the optical network is defined by the expected power spectral profiles at each point, the gain settings of each amplifier, the losses of each fiber, etc.;

$\Delta N$ is the equivalent additive noise of the element referenced at the output of the element in linear units (e.g., mW) within a given bandwidth. Again, elements are in the optical network and can include, without limitation, fibers, amplifiers, Wavelength Selective Switches (WSS), gain flattening filters, Variable Optical Attenuators (VOAs), Optical Add/Drop Multiplexers (OADMs), and the like; and $S_{out}$ is the signal power at the output of the element in linear units (e.g., mW) typically within the same bandwidth as $\Delta N$, which is nominally the bandwidth of a channel of interest.

The $\Delta N$ parameter can be due to various equivalent noise sources across the element, including Amplified Spontaneous Emission (ASE) and Kerr Nonlinear-Interference (NLI). A concatenation of elements describes a path in the optical network, such as an Optical Multiplex Section (OMS), where each element has approximately independent noise sources will have an incremental NSR simply described by the sum of each of their incremental NSRs, which is obvious from the definition of incremental NSR above:

$$\Delta NSR_{ensemble}(v) = \sum_k \Delta NSR_k(v) \quad (1.2)$$

The aspect of approximately independent noise sources is the case for most elements in an optical path, apart from some older low dispersion fibers, which can be addressed with a coherent correction. This means the path SNR, which is directly convertible into maximum achievable capacity, can be immediately obtained as simply the inverse of the sum of all incremental NSRs within a path.

For concatenating incremental NSRs, first, the incremental NSR of a given element depends on the output signal power, and, therefore, depends on the concatenated incremental NSR of all elements preceding a given element (since the equivalent noise from all upstream elements must be removed). This may seem contradictory at first in that it is not possible to know the exact incremental NSR of a given element "in a vacuum" without knowing the incremental NSR of all preceding elements; however, if the power state of the network defined by system control objectives is approximately known, it is possible to assume any input NSR to when evaluating an element and correct for it using the techniques described in § 3.0 Incremental NSR Correction.

Second, the incremental NSR of a concatenation of fibers will have a coherent penalty due to the interaction between fibers. This can be corrected using the techniques described in §§ 4.0 and 5.0.

§ 1.1 Process for Determining Incremental NSR

Figure 2:
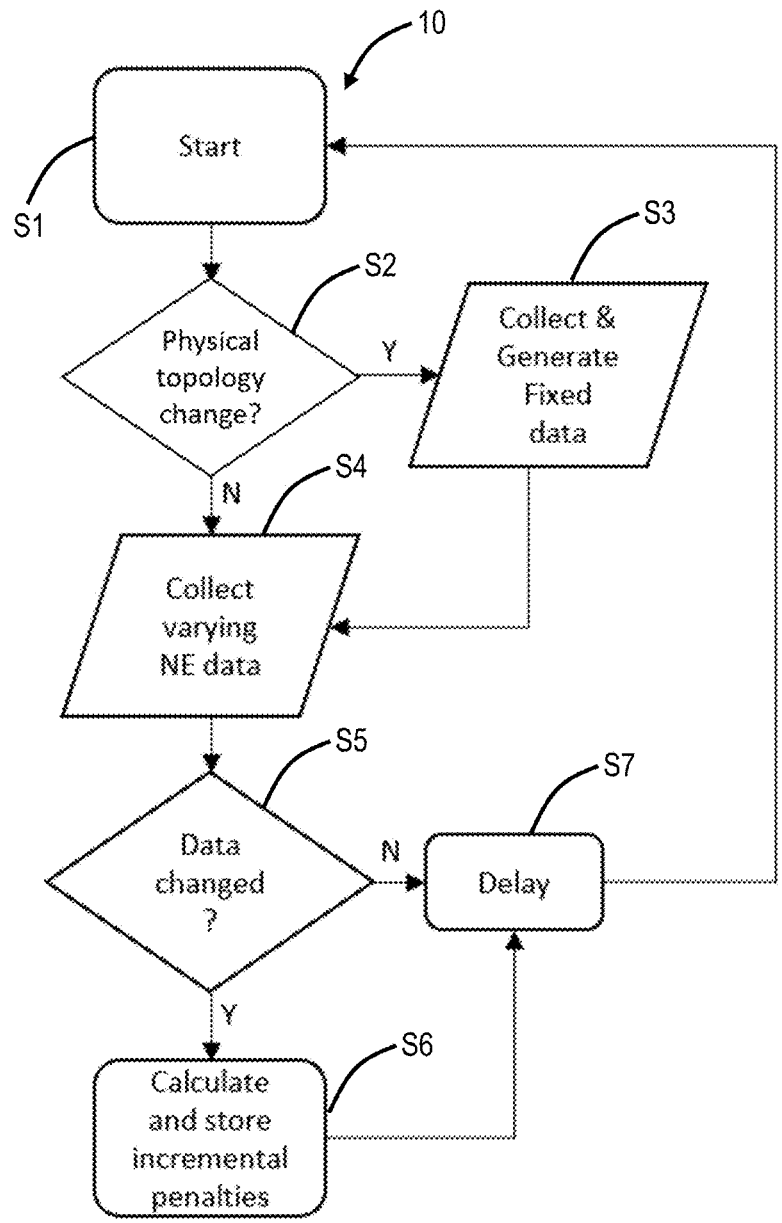
FIG. 2 is a flowchart of a process that, for a given optical network state, provides steps taken in a polling-based approach to determine the incremental NSR for the elements in the optical network.

FIG. 2 is a flowchart of a process 10 that, for a given optical network state, provides steps taken in a polling-based approach to determine the incremental NSR for the elements in the optical network. This is described as a polling-based approach but could be implemented based on state change instead as well as in addition to. Of course, other embodiments are also contemplated with the process 10 presented for illustration purposes. The process 10 starts (step S1) based on the polling-based approach, i.e., after a certain period, automatically implemented, manually implemented. In a state changed-based approach, the process 10 can start after a network change, e.g., topology change, capacity change, etc.

The process 10 includes a determination if there has been a physical topology change in the network (step S2), meaning one or more elements have been added, removed, changed, etc. If so (step S2), the process 10 includes the collection and generation of fixed data (step S3). If there has been no physical topology change (step S2) or after the collection and generation of fixed data (step S3), the process includes collection of varying network element data (step S4). The process 10 includes a determination if the data has changed (step S5), namely the data collected in steps S3, S4. If the data has changed (step S5), the process 10 includes calculation and storage of the incremental penalties, i.e., incremental NSR for each element (step S6). If the data has not changed (step S5) or after the step S6, the process 10 includes a delay (step S7) until the next iteration is performed.

Additional details for the associated steps are described. For the collection and generation of fixed data (step S3), this includes data such as factory calibration data, fiber characteristics, etc. and it only needs to be captured once until the physical topology of the system changes. This could be a collection of information such as EDFA characteristics (noise figure, ripple, dynamic gain tilt, etc.) as well as fiber characteristics such as length, loss, fiber type (or fiber characteristics. For example, fiber characteristics may be collected as described in POT Patent Application PCT/US20/25177, filed Mar. 27, 2020, and entitled "Optical fiber characterization using a nonlinear skirt measurement," the contents of which are incorporated by reference in their entirety. The collection and generation of fixed data (step S3) provide the physical parameters required to model the physical behavior of the optical system. This step can also include generation of intermediate parameters which are expensive to calculate once based on other fixed data but can be stored and reused in future calculations, such as nonlinear coupling coefficients described in § 6.0 as $\phi_{m,n}$.

For the collection of varying network element data (step S4), this can include Performance Monitoring (PM) data, such as power, power spectrum, gain state of EDFAs, etc., which can vary over time due to perturbations (e.g., fiber pinch changing loss). This PM data is collected to capture the current state of the network—this step could also include defining a state of the network which is not currently present including simulated elements that are not currently available or an anticipated future state of the existing network (e.g., different channel density conditions).

For the calculation and storage of the incremental penalties (step S6), this is performed on a per OMS basis, but the incremental SNR results are on more granular elements (e.g., amplifiers, fibers, etc.). The OMS in an optical network is an all-optical link between OADM elements. The OMS includes various elements, but the channel capacity is fixed along an OMS since there are no elements to add/drop channels within the OMS. The calculation and storage of the incremental penalties (step S6) include a determination of the power state of the network per OMS (power spectrum or expected power spectrum at every node in the network) by:

Forward modeling transfer functions of different elements (e.g., Wavelength Dependent Loss (WDL) and Stimulated Raman Scattering (SRS) in fiber, such as described in Han, Qun, et al, "Novel shooting algorithm for highly efficient analysis of fiber Raman amplifiers," Journal of Lightwave Technology 24.4 (2006): 1946-1952, the contents of which are incorporated by reference herein, and the gain transfer function in EDFAs due to homogeneous and inhomogeneous broadening such as described in Bolshtyansky, Maxim. "Spectral hole burning in erbium-doped fiber amplifiers.: Journal of Lightwave Technology 21.4 (2003): 1032-1038., the contents of which are incorporated by reference herein, plus any lumped losses or filter shapes); and Backward error correction when spectral information is available (i.e., by comparing the forward modeled spectral information with any available spectral monitors and within the OMS, typically at the output and distributing the error between forward model and direct measurement back onto elements within the OMS).

The calculation and storage of the incremental penalties (step S6) further include calculating the incremental NSR of each element at selected frequencies as:

$$\Delta NSR_{ASE} = \frac{\Delta N_{ASE}}{S_{out}} \tag{1.3a}$$

$$\Delta NSR_{NLI} = \frac{\Delta N_{NLI}}{S_{out}} \tag{1.3b}$$

$$\Delta NSR = \Delta NSR_{ASE} + \Delta NSR_{NLI} = \frac{\Delta N_{ASE} + \Delta N_{NLI}}{S_{out}} \tag{1.3c}$$

Where at this point, all the values are known from the previous step. In the case of EDFAs, $$\Delta N_{ASE} = h\nu\Delta\nu(G \cdot NF - 1) \tag{1.4}$$

Where: h is Planck's constant, $\nu$ is frequency, $\Delta\nu$ is the bandwidth of integration, G is the amplifier gain (linear) at frequency v which is known from the EDFA modeling, and NF is the amplifier noise figure at frequency v and is typically available from factory calibration or statistical data known to the network equipment provider (as a function of amplifier state which is also known). $\Delta N_{NLI}$ is typically small enough to be neglected, or in the case of L-band EDFAs may be characterized as a function of the EDFA state and stored on the device with calibration data, much like noise figure.

In the case of fibers, including Raman amplified fibers, $\Delta N_{ASE}$ can be found by solving the differential equations described in Han, Qun, et al. "Novel shooting algorithm for highly efficient analysis of fiber Raman amplifiers." Journal of Lightwave Technology 24.4 (2006): 1946-1952, for example, and $\Delta N_{NLI}$ is described in §§ 4.0 and 5.0, for example.

At the outcome of the process 10, the incremental NSR penalties are stored. Once the incremental NSR (or equivalently SNR) is captured for a given set of network states of interest, they can be consumed for various use cases as now described.

§ 2.0 Use Cases

§ 2.1 Rapid Path Performance Calculation:

In both network planning and operation, there are numerous cases where the rapid computation of a path performance is useful. For example, this can be used in real-time path viability determinations. As described herein, real-time means the processes are quick and able to provide results in seconds. The rapid performance modeling can be applied to current data (real-time or near real-time) as well as historical data—seconds, hours, or any older data. The real-time path viability determinations can determine if planned restoration routes are viable based on current conditions of the network (i.e., "Restoration in jeopardy" tracking). The real-time path viability determinations can be used to make in-situ decisions on which path to route on based on the best current performance by simultaneously tracking multiple possible restoration routes. As is known in the art, in-situ means local such as a local decision by a network element performing path computation. Other use cases can include higher-level applications (e.g., Routing, Modulation, and Spectrum Assignments (RMSA) decision making for routing). Also, planning tools can utilize the techniques described herein for network planning purposes.

§ 2.2 SNR-Based Routing

Path computation is performed to determine a path or route through the optical network for a demand and decides the path based on the state of the network and costs. Current routing decisions are often made based on minimizing path length (as the cost), for example, but the performance is ultimately dictated by the SNR, not proxy metrics like the length. The incremental SNRINSR lends itself extremely well to make decisions based on routing since it is a straightforward input into a cost-function or can be directly utilized as the cost. A Path Computation Engine (POE) utilizing Dijkstra or similar algorithm could consume the incremental NSRs to determine the lowest cost (best SNR performance) directly, rather than using proxy cost metrics. A key aspect is the incremental NSR calculation is real-time and thus provides better data than proxy cost metrics without the disadvantage of calculation time and power.

§ 2.3 Noise Localization

Visibility of the incremental SNR/NSR gives direct information about the local performance of individual elements (spans, amplifiers, sections, etc.) of the network. It is possible to look at individual spans or OMSs to see which areas are contributing better or worse performance both in relative (e.g., relative to planning) or absolute terms. In observing performance relative to planning, this can be extremely useful in debugging network performance by finding which spans/sections, etc. are out of specification if a path is not performing as expected. The absolute incremental SNR/NSR numbers for given spans/sections can be used to qualify each other against the other spans/sections in the network which can be used to prioritize repair and maintenance (for the worst-performing parts of the network) or to make routing decisions as discussed above, for example.

§ 2.4 Monitoring System Performance Variation Over Time

By monitoring the incremental SNR/NSR variation throughout the network, this provides a better idea of the overall network performance variation over time. As an example, an operator may currently track power variation over time, and where a 3 dB variation may raise concerns, but that may translate to a small added penalty in terms of the incremental SNR/NSR in absolute units such that it would not affect a channel passing through that set of elements noticeably. On the other hand, some smaller power variation elsewhere in the network may trigger a large additional incremental SNR/NSR penalty, which would affect channels passing through those elements, and it is better to focus on these areas. That is, the incremental SNR/NSR is a much better and useful metric in terms of absolute network performance.

§ 2.5 Optimization Using APIs

By regularly tracking the incremental SNR/NSR across different elements in the network (and possibly for different network states simultaneously), the data could be consumed by a large number of different higher-layer applications, via Application Programming Interfaces (APIs). That is, the tracking of the incremental SNR/NSR across different elements can be at the network element level and/or at the management level, and this data can be advertised, via APIs, to other applications. Some example applications can include 1) variable bandwidth restoration applications (e.g., find protect routes that have different bandwidth values as working routes), 2) bandwidth optimization applications, 3) path viability applications (tracking planned restoration route performance before channels are moved), 4) maintenance and repair prioritization applications, 5) RMSA utilizing SNR-based routing, 6) defragmentation applications (e.g., moving existing channels to better SNR paths, to improve the overall state of the network).

§ 3.0 INCREMENTAL NSR CORRECTION

Adding incremental NSRs of Additive-White-Gaussian Noise-producing (AWGN-producing, or approximately AWGN-generating) elements is a convenient way to determine the total penalty of a concatenation of such elements. The issue is that the noise from upstream objects changes the incremental NSR of a given element downstream. For this reason, it is not possible to evaluate incremental NSRs independently and add them together without some form of correction. The correction to this analysis is described in this section.

Figure 3:
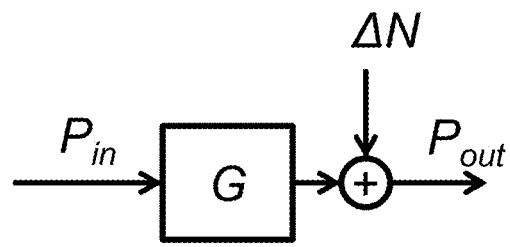
FIG. 3 is a diagram of the definition of an Additive-White-Gaussian Noise (AWGN)-producing element.

FIG. 3 is a diagram of the definition of an AWGN-producing element. An arbitrary AWGN-producing element or concatenation of AWGN-producing elements can be modeled as in FIG. 3 at a given frequency, within a given bandwidth:

$$S_{out} = G \cdot S_{in} \quad (3.1)$$

$$N_{out} = G \cdot N_{in} + \Delta N \quad (3.2)$$

where $P_{in/out} = S_{in/out} + N_{in/out}$ is total input/output power (linear units)

G is the element gain (linear units)

$S_{in/out}$ is the input/output signal power (linear units)

$N_{in/out}$ is the input/output noise power (linear units)

$\Delta N$ is the additive AWGN power of the element referenced at the output (linear units)

The incremental NSR of an AWGN-producing element or concatenation of AWGN-producing elements is given by $$\begin{aligned}
\Delta NSR &= NSR_{out} - NSR_{in} \quad (3.3)\\
&= \frac{N_{out}}{S_{out}} - \frac{N_{in}}{S_{in}}\\
&= \frac{G \cdot N_{in} + \Delta N}{G \cdot S_{in}} - \frac{G \cdot N_{in}}{G \cdot S_{in}}\\
&= \frac{\Delta N}{G \cdot S_{in}} = \frac{\Delta N}{S_{out}}
\end{aligned}$$

Where it is noted that the incremental NSR is proportional to the inverse of the input signal power within a given bandwidth only, not the total input power within a given bandwidth.

If one were to evaluate the incremental NSR penalty of an element without knowing what came before that object, one is forced to make some assumption about the input NSR into our element under investigation. If the input assumed NSR of an element is incorrect, the calculated incremental NSR of that element will also be incorrect and thus cannot be concatenated directly with other elements incremental NSRs. Assuming the total power was correct in evaluating the calculated incremental NSR*, one can find the corrected incremental NSR penalty by simply scaling by the correct input signal power:

$$\Delta NSR_{corr} = \Delta NSR_{calc} \cdot \frac{S_{in,calc}}{S_{in,corr}} \quad (3.4)$$

The input signal power can be rewritten in terms of total power in input NSR as:

$$P_{in} = S_{in} + N_{in} \text{ and } NSR_{in} = \frac{N_{in}}{S_{in}} \rightarrow S_{in} = \frac{P_{in}}{1 + NSR_{in}}$$

Rewriting the equation (3.4) (where we note the assumption that the total input power was correct):

$$\Delta NSR_{corr} = \Delta NSR_{calc} \cdot \frac{1 + NSR_{in,corr}}{1 + NSR_{in,calc}} \quad (3.5)$$

In the case where it is assumed that all input power is signal power (typical case), the correction becomes simply:

$$\Delta NSR_{corr} = \Delta NSR_{calc} \cdot (NSR_{in,corr} + 1) \quad (3.6)$$

This is simply a recursive function to generate correct incremental NSRs per element which can then be added in the usual way:

```
Function [dNSR_corr, dNSR_tot] =
correctAndConcatenateNSRs(dNSR_calc, NSR_in)
   dNSR_corr(1) = dNSR_calc(1)*(NSR_in + 1);
   For idx = 2:numEl
      dNSR_corr(idx) = dNSR_calc(idx)*(sum(dNSR_corr(1:idx−1))+1);
   End
   dNSR_tot = sum(dNSR_corr);
END
```

§ 4.0 Rapid Optical Communication Path Viability Determination Enabled By Simplified Coherent Nonlinear Interference Estimation In an embodiment, the present disclosure includes a process to efficiently and accurately determine physically viable optical communication paths. This process could be used in concert with path ranking algorithms to quickly perform live optimal Layer 0 restorations in a mesh network without having to pre-plan for restoration paths (or greatly reduce the amount of planning required) and in determining performance costs in RMSA algorithms. The process uses modular calculated values of incremental SNR due to ASE, and other line penalties for each element (which can be stored for later use), and by having a rapid coherent nonlinear penalty calculator, it is possible to calculate the SNR margin of an arbitrary path fast enough that it could be used to make real-time system path viability decisions (e.g., sub-second total computation, versus multiple minutes to hours for existing approaches).

In an embodiment, a process is described to efficiently and accurately determine physically viable paths in an optical network in terms of the available contiguous frequency spectrum to support a given baud rate, and in terms of SNR performance to support the desired line-rate for a given modem technology which is present in the network. The SNR performance can be inferred from measured network data, including power monitors, power spectrum monitors, and SNR, as reported by optical modems. Also, the SNR performance can be inferred from modeled network behavior (i.e., modeled linear and nonlinear performance penalties).

Current approaches of determining viable paths are performed with offline computing resources and do not meet the computation time requirements be performed dynamically within the network, or by an in-skin orchestrating layer. The determination of viable paths is typically done using offline modeling tools, which require long simulation times largely due to the long computation times of nonlinear penalties. That is, the current approaches are computationally complex, requiring significant time.

In optical network planning and design, physics-based modeling tools are used to determine path impairments to make decisions about how to route channels, which guarantees performance. The present disclosure provides a simple method to quickly determine optical communication path viability and performance much faster than traditional techniques. The present disclosure uses a simple, coherent NLI model. This could be applied to both:

1) Significantly reduce time spent in system design/network planning, and more critically, and
2) Make real-time path viability decisions (e.g., in the case of a fiber cut or other failure, it is possible to determine an optimal path to re-route to dynamically—current techniques require designated restoration paths and are thus less adaptive, and more complex to design around).

One of the impairments required to model, which is difficult to compute both quickly and accurately, is the NLI penalty due to the Kerr effect. The procedure to determine this penalty involves solving the Nonlinear Schrödinger Equation (NLSE) which could be done, for example, using a Split-Step Fourier (SSF) technique which is very accurate but also very computationally expensive, which leads to computation times which are far too long for real-time path viability determination.

Over the past several years, a Gaussian Noise (GN) model has risen to prominence in academic literature for modeling NLI, whereby the NLI is computed assuming all power sources are GN, which typically gives an upper bound estimate of the amount of NLI that would be generated (again, see, e.g., Poggiolini, Pierluigi. "The GN model of non-linear propagation in uncompensated coherent optical systems," Journal of Lightwave Technology 30, no. 24 (2012): 3857-3879), Poggiolini, Pierluigi, G. Bosco, A. Carena, V. Curri, Y. Jiang, and F. Forghieri, "The GN-model of fiber non-linear propagation and its applications," Journal of Lightwave Technology 32, no. 4 (2014): 694-721, and Poggiolini, Pierluigi, Gabriella Bosco, Andrea Carena, Vittorio Curri, Yanchao Jiang, and Fabrizio Forghieri, "A detailed analytical derivation of the GN model of non-linear interference in coherent optical transmission systems," arXiv preprint arXiv:1209.0394 (2012), the contents of each are incorporated herein by reference.

This makes the GN model a safe technique to estimate NLI as a performance penalty, since it is usually very close to reality and, if it is wrong, it is pessimistic in modeled performance. The difficulty with the GN model is the complete form equation remains very complex to solve, which is why the typically used equations in literature make numerous assumptions and/or approximations to simplify the functional form. The most common assumptions are that all fibers in a path have the same characteristics (length, type, etc.) and that discrete amplifiers exactly compensate for the loss of a preceding fiber. These approximations work well in many submarine optical deployments but are very unrealistic in most terrestrial systems, which limits the realistic application space of the GN model.

The nonlinear noise to signal ratio ($NSR_{NL}$) as computed by the GN model, can conveniently be separated into two parts which sum together, which are the incoherent contribution and coherent contribution:

$$NSR_{NL,n}(N_s) = NSR_{NL,n}^{IC}(N_s) + NSR_{NL,n}^{cc}(N_s) \quad (4.1)$$

Where $NSR_{NL,n}^{IC}(N_s)$ is the incoherent contribution of the NLI generated on the $n^{th}$ channel due to the $N_s$ spans in the path, and $NSR_{NL,n}^{cc}(N_s)$ is the coherent contribution of the NLI generated on the $n^{th}$ channel due to all spans between the first and $N_s^{th}$ span in the path. With some reasonable approximations of a surface shape to integrate over, the first part of this equation has a closed-form analytic solution:

$$NSR_{NL,n}^{IC}(N_s) = \quad (4.2)$$

$$\sum_{k=1}^{N_s}\sum_{m=1,m\neq n}^{N_{ch}} \frac{8}{27} \frac{\gamma_m^2(k)L_{eff,m}^2(k)\alpha_m(k)P_m^2(k)}{\pi\beta_{2,m}(k)B_{ch,m}^2}\left\{\operatorname{asinh}\left(\frac{\pi^2\beta_{2,m}(k)B_{ch,m}}{\alpha_m(k)}\left[(f_m-f_n)+\right.\right.\right.$$

-continued $$\left.\left.\left.\frac{B_{ch,m}}{2}\right]\right)-\operatorname{asinh}\left(\frac{\pi^2\beta_{2,m}(k)B_{ch,m}}{\alpha_m(k)}\left[(f_m-f_n)-\frac{B_{ch,m}}{2}\right]\right)\right\}+$$

$$\frac{8}{27}\frac{\gamma_n^2(k)L_{eff,n}^2(k)\alpha_n(k)P_n^2(k)}{\pi\beta_{2,n}(k)B_{ch,n}^2}\operatorname{asinh}\left(\frac{\pi^2\beta_{2,n}(k)B_{ch,n}^2}{2\alpha_n(k)}\right),$$

Where
$P_m(k)$ is $m^{th}$ channel power at the beginning of $k^{th}$ span,
$B_{ch,m}$ and $f_m$ are bandwidth and central frequency for channel m, respectively,
$L_{s,m}(k)$ and $L_{eff,m}(k)$ are span length and effective length for channel m at $k^{th}$ span, respectively, and
$\gamma_m(k)$, $\beta_{2,m}(k)$ and $\alpha_m(k)$ are nonlinear coefficient, second-order dispersion coefficient, and attenuation coefficient for channel m at $k^{th}$ span, respectively.

The second part of the equation (4.1) which is $NSR_n^{CC}(N_s)$ does not have a simple or generic form published in the literature. This is a large part of what is addressed herein. By recognizing the Self-Phase Modulation (SPM) term was the dominant term in the coherent contribution, a simple and generic coherent contribution term is derived, which can be applied in mixed baud-rate, mixed fiber (heterogeneous) systems where other simplified GN models are not applicable.

The coherent contribution can then be written as:

$$NSR_{NL,n}^{CC}(N_s) = \quad (4.3)$$

$$\begin{cases} \frac{16}{27}\sum_{N_s'=2}^{N_s}\gamma_n(N_s')L_{eff,n}(N_s')P_n(N_s')\sum_{k=1}^{N_s'-1}\frac{\gamma_n(k)L_{eff,n}(k)P_n(k)}{\pi\tau_{CD,n}(k,N_s')B_{ch,n}^2}, & N_s > 1 \\ 0, & N_s = 1 \end{cases}$$

$$\tau_{CD,n}(k,N_s) = \sum_{l=k}^{N_s-1}\beta_{2,n}(l)L_{s,n}(l) \quad (4.4)$$

For brevity in the remainder of this document, this is referred to as the combined simplified NLI model as FCGN for "Fast Coherent GN" model.

§ 4.1 Efficacy of Model

To demonstrate the accuracy of the FCGN, simulation line-ups were performed against a conventional model that models propagation impairments through a combination of an SSF solver (SPM) and proprietary non-linear Wavelength Division Multiplexing (WDM) estimators (Four-Wave Mixing (FWM), Cross-Phase Modulation (XPM), Cross-Polarization Modulation (XPoIM)).

In addition, the results as solved are plotted by only considering the incoherent part of the GN model since this process could also be considered for arbitrary heterogeneous fiber systems.

Figure 4:
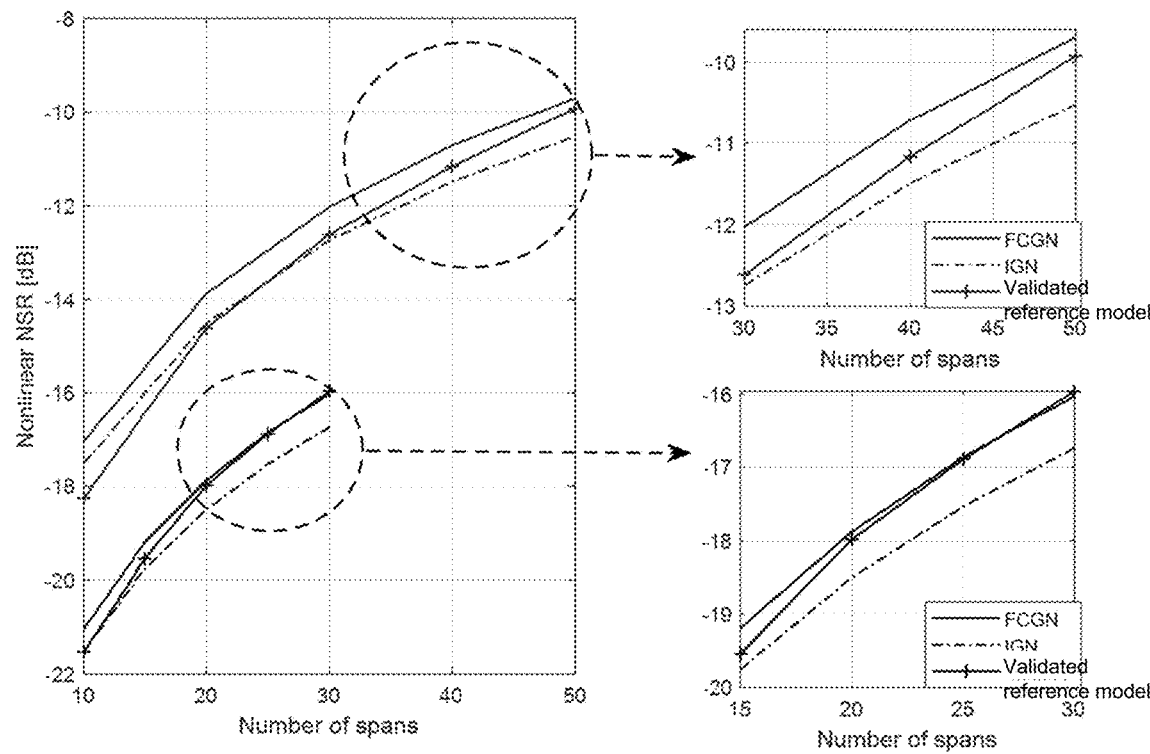
FIGS. 4 and 5 are graphs illustrating nonlinear Noise-to-Signal ratio (NSR) for a channel at 1550 nm versus the number of spans using the proposed Fast Coherent Gaussian Noise (FCGN), Incoherent GN model (IGN), and the conventional model over a homogeneous link with uniform symbol rate and channel spacing.
Figure 5:
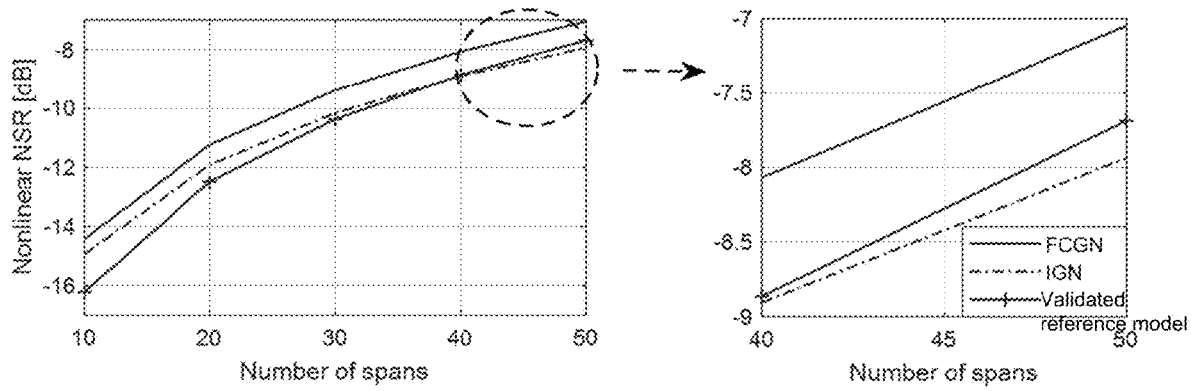

FIG. 4 illustrates NSR for a channel at 1550 nm versus a number of spans for 56/200 Gbps transmitter with 3 dBm launch power and 56/400 Gbps transmitter with 0 dBm launch power over NDSF. The span length is 80 km. The system is 64 channels with 75 GHz channel spacing. The right graph is the zoom in the left graph. FIGS. 4 and 5 investigate nonlinear Noise-to-Signal ratio (NSR) for a channel at 1550 nm versus the number of spans using the proposed Fast Coherent Gaussian Noise (FCGN), incoherent GN model (IGN), and the conventional model over a homogeneous link with uniform symbol rate and channel spacing. In both FIGS. 4 and 5, a 64-channel WDM system using 56

GBd transceivers with 75 GHz channel spacing is modeled. In FIG. 4, the channels are sent over 80 km spans of Non-Dispersion Shifted Fiber (NDSF) fiber, where one plot corresponds to a line rate of 200 Gbps, and another plot corresponds to a line rate of 400 Gbps. In FIG. 5, the channels are sent over 80 km spans of Truewave Reduced Slope (TWRS) fiber with a line rate of 200 Gbps.

The plots in FIGS. 4 and 5 show that the FCGN is always slightly pessimistic in NSR performance when compared with the conventional model (i.e., the nonlinear penalty is overestimated), but converges with the conventional model when the signal looks more like Gaussian noise either by having high cardinality modulation formats or passing through enough net dispersion or a combination of the two effects. For the above reasons, the results between FCGN and the conventional model converge faster on NDSF fiber (due to higher dispersion compared to TWRS), and even faster on NDSF when using 400 Gb/s. This is contrary to an IGN model, which diverges with the conventional model at high span counts, where the IGN performance becomes optimistic compared to the conventional model. This is the expected behavior of a complete GN model (such as FCGN) and an IGN model. The behavior of a complete GN model is a desirable feature when determining if a route is safe to transmit data onto (i.e., for path viability determination) since we would rather be slightly pessimistic in evaluating performance, but still very close to the correct answer.

Figure 6:
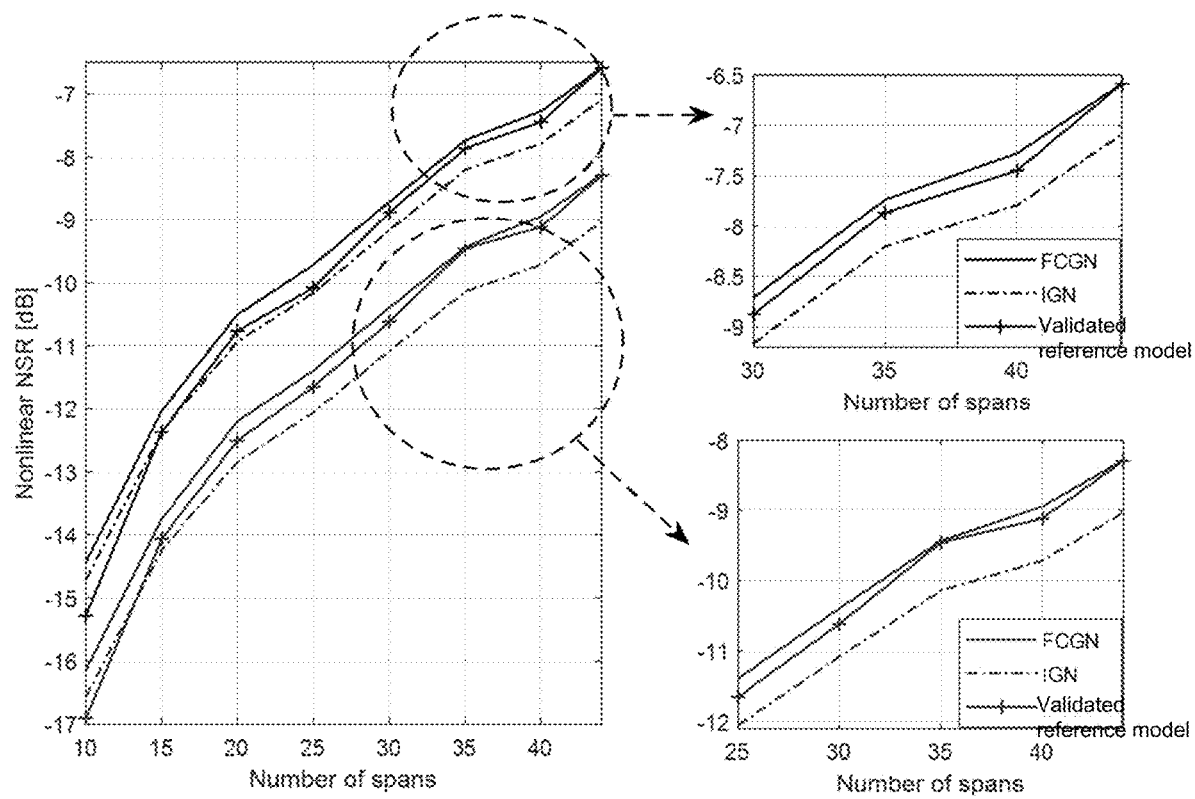
FIG. 6 is a similar graph as FIGS. 4 and 5 over a random heterogeneous link.

The results in FIGS. 4 and 5 could be achieved with a simplified GN model which has the implicit assumption of common fiber type on each span, so to show the true value of the FCGN model, FIG. 6 models the more realistic case of a random assortment of mixed fibers for which a simplified "complete" GN model could not be applied to. Here, a random assortment of fibers is generated based on statistics from an actual network on the likelihood of different common fiber types.

The fiber order in the model was as follows: [7×NDSF, 3×TWRS, 3×NDSF, 3×Truewave Classic (TWC), 2×Enhanced Large Effective Area Fiber (ELEAF), 6×NDSF, 5×TWRS, 4×ELEAF, 2×TWC, 4×NDSF, 2×ELEAF, 3×TWC]. The per-channel launch power for NDSF, TWRS, TWC, and ELEAF is 3 dBm, 0 dBm, 0 dBm, and 1 dBm, respectively. In this heterogeneous fiber case, a uniform baud rate systems and mixed baud rate systems are modeled. The uniform baud system is modeled where all channels are 56 GBaud at 200 Gb/s, while the mixed symbol rate system consists of 38 total 56 GBaud 200 Gb/s channels and 38 total 35 GBaud 200 Gb/s channels, with 61.5 GHz and 37.5 GHz channel bandwidths for two symbol rates, respectively. In both cases, the probe channel at 1550 nm is a 56 GBaud, 200 Gb/s channel.

Looking at the results from FIG. 6, similar results are seen as FIGS. 4 and 5, where the FCGN converges well with the conventional module results and is always pessimistic if there is a discrepancy, whereas an incoherent model will start diverging and underestimating the nonlinear penalty. This shows that the FCGN model would be an appropriate tool to estimate nonlinear penalty for rapid path viability determination even in the realistic cases of heterogeneous fiber types and baud rates.

§ 4.2 Procedure for Path Viability Determination

The following procedure could be implemented on network element hardware directly, or in an appropriate orchestration layer which may include a computer or network of computers with north/south-bound communication to the network element layer, or even in an offline modeling tool.

1) Starting at the add-node, first, perform the operation of finding paths which have the appropriate contiguous frequency spectrum available on an entire route from the add-node to the desired drop-node to support the required baud-rate of a given modem technology (which may be adapted in the case of variable baud-rate modems). The architecture of the Reconfigurable Optical Add/Drop Multiplexers (ROADMs) at the add-node and drop-node, and which connected transceivers are available and appropriately connected to client traffic will dictate which directions that can add and drop channels onto and whether it can handle MUX-path frequency contention. Once this is determined, the optical frequency spectrum (e.g., C-band, or C&L-bands) can be discretized into the minimum resolution of Media Channels (MCs) which could be 6.25 GHz (e.g., 768 frequency slices for the C-band), where truth tables are generated for each optical section with a '1' indicating that part of the frequency spectrum is occupied and a '0' indicating the channel space is available. On any given path from the add-node to drop-node (i.e., routing through any set of physically possible intermediate nodes), one can determine the parts of contiguous frequency spectrum by simply running an OR operation across all truth-table vectors for each optical section within the path of interest and look for groups of contiguous 0's available indicating available spectrum.

2) Once it is known which sections are viable in terms of available frequency content, one would then model the physical impairments along with the set of paths under consideration which includes, but is not limited to the following:

a) Determining power spectrum information at every node in the network required for penalty modeling using a combination of simulated and measured data. This is done by forward modeling transfer functions of different line elements (e.g., Wavelength Dependent Loss (WDL) and Stimulated Raman Scattering (SRS) in fiber, and the gain transfer function in Erbium-Doped Fiber Amplifiers (EDFAs) due to homogeneous and inhomogeneous broadening, plus any lumped losses or filter shapes due) followed by a backward error correction when spectral information is available.

b) Modeling linear optical NSR impairments as a function of frequency and section due to additive ASE generated from EDFAs and Raman amplifiers. These impairments could either be modeled in real-time or modeled once at system start-up (once system configuration including losses, gain settings, etc. are known) and stored for future access.

c) Modeling Tx/Rx impairment losses as well as eye-closure based either on data stored on the Tx/Rx pair, or table values, or a combination of the two.

d) Modeling Polarization Dependent Loss (PDL) penalty and filter penalty based on the hardware on any given path and table values.

e) Modeling nonlinear coherent noise penalty based on the FCGN discussed above.

f) If available, compare modeled results with other existing channels that can report effective SNR on the proposed path to determine how pessimistic the model is (e.g., compare against results from other approaches) and then modify estimated values to give a better gauge of anticipated performance.

The performance of a path is then given by the effective delivered SNR, which includes the summation of all incremental NSR penalties due to the various effects along the path.

3) Once physical performance for every path is known (in terms of total delivered effective SNR), one would then compare the required SNR for the available modems at the line-rates which are available to the estimated delivered SNR on each path to determine which paths are viable for the required line-rates, Once this is known, some other path-ranking algorithm could take over to decide the "best" path based on customer preference (e.g., latency, minimum margin, maximum margin, etc.).

§ 4.3 SNR Performance

Optical path viability can be expressed as incremental SNR which is the penalty due to an element (or set of elements) and which is given in linear units as $\Delta SNR \equiv (SNR_{out}^{-1} - SNR_{in}^{-1})^{-1}$, or more simply considering noise to signal ratios (inverse SNR): $\Delta NSR \equiv NSR_{out} - NSR_{in}$. Incremental SNR is the amount of the noise that is contributed to the total SNR from the item under scrutiny, that item being a span, section, sub-path, or path. Using incremental NSR makes the impact a direct proportionality to the margin. To determine the penalty of a concatenation of elements, it is possible to sum their incremental NSRs (by definition), namely $NSR_{total} = \Sigma NSR_i$. In an embodiment, the term "span" refers to a span/amp combos considering both the linear and nonlinear penalty contributions, which can be parameterized by fiber type, amplifier settings, fiber loss, as well as some other variables, It is possible to view the NSR of each sub-component (item) of the total with respect to one another. Assume the NSR is expressed in dBs—One may choose different colors or other visualizations to express link average NSR. For example, at −15 dB, green may represent the link average NSR of the contributing elements. Elements that contribute more noise are yellow, and ones that contribute less are blue, etc.

However, understanding deltas in these variables alone does not give any intuition into how much penalty is being imparted on the network. Rather, this is where exposing the incremental SNR (or equivalently NSR) penalty has clear, tangible value. Under nearly GN NLI cases, the photonic performance delivered by the system can be presented without modems (i.e., the delivered SNR of the system is not a property of the signal, but the visualization decouples the intrinsic photonic system performance and reporting that which is very nearly modem agnostic). SNR is directly convertible to a theoretical capacity via the Shannon-Hartley theorem (in fact, nearly linear relationship between SNR in dB and capacity in Gbps under many practical SNR regimes).

The present disclosure is also not focused only on the linear performance, which is the OSA measurable OSNR or ASE. It is only when you include the actual signal power that the non-linear performance can be calculated. When added to the linear performance, the total incremental SNR is calculable. Of note, boiling the metric down to a single parameter allows for visualization.

§ 4.4 Span Contribution

There are many possibilities related to how to report the per span/section data (e.g., as absolute penalties, the penalty per unit distance, relative to planned as you are highlighting, relative to planned with some normalization, etc.), including in the context of a path.

For example, assume a 10-span optical system (e.g., two ROADM nodes with nine intermediate line amplifiers, i.e., ten links 120). Assume each span will contribute ~1/10 of total noise. So, if one span is 3 dB worse, the total system will just look like an 11-span system, i.e., a relatively small degradation. However, the goal in the operation of the optical network is to exploit unused margin, to mine such margin for extra capacity. So, in this case, with equal span penalties, a 3-dB degradation in one span translates to a 0.4 dB total path penalty, which may push a channel from operating at a healthy margin to being close to the edge or at failure.

In general, it is not true that on a randomly selected ten span path, one would expect equal penalty on each span and this is a point to highlight (especially when showing per span penalty in absolute units) since there is a large distribution of fiber types, fiber losses, amp types (with different Noise Figures (NF) in different gain ranges), OADMs with different penalties, etc. especially on networks built over time or with uneven site spacing due to sensible geographical add/drop locations. It may be the case that in a ten span system, there is one span contributing half of the total penalty, so when it's incremental SNR penalty moves by 2 dB, it is actually shifting the total penalty of the path by 1.1 dB, and the penalty can be reported in the context of the path it's on (i.e., this 2 dB drop is contributing a degradation of 1.1 dB of the total path SNR, whereas some other 2 dB drop on one of the "good" spans is degrading the total path SNR by 0.1 dB). There are also plenty of cases where there are a few spans, especially with higher rate modems where the operation is close to the edge. In these cases, a change in one span may be even more significant.

These issues can lead to silent failures when a service tries to restore onto them. As mentioned, many routes include a small number of hops. As a part of capacity mining, a network operator is intentionally pushing the modem rate to its minimum delivered margin on some routes while backing off to lower rates on routes that otherwise would not provide sufficient margin.

Figure 7:
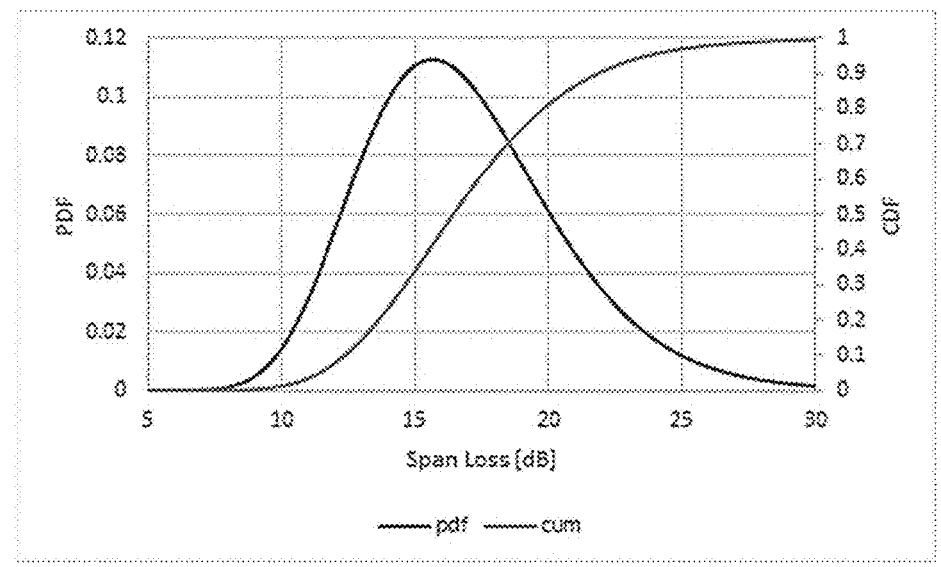
FIG. 7 is a graph of the distribution of span losses in typical networks.

This is precisely why these visualizations are useful. Fiber spans in a real network often have a large range of losses. FIG. 7 is a graph of the distribution of span losses in typical networks. Typical networks have a log-normal distribution of span losses, as illustrated in FIG. 7. The difference between a 3 dB delta on a 10 dB span versus a 25 dB span is significant; therefore, just looking at deltas is very misleading. The 10 dB span is insignificant comparatively, and using the NSR scale makes that visually obvious.

§ 5.0 Heterogenous GN Derivation and Simplication

In this section, the coherent contribution from Self-Channel Interference (SCI) is derived. The coherent term can be added to the existing incoherent model. The following assumptions are made.

Lumped amplification is applied;

Only the coherent contribution of the probe to probe is considered (the coherent contribution of interfering channel to probe is relatively small and can be ignored here);

Some assumptions would be followed in the derivation process; and

Higher-order dispersion coefficient is ignored,

The following parameters are used herein:

| | |
|---|---|
| $P_{n_s}$ | power of probe channel at the beginning of $n_s^{th}$ span. specifically, $P_{n_s}$ (m) is power for $n_s^{th}$ span for channel m |
| $P'_{n_s}$ | power at the end of $n_s^{th}$ span. |
| $\gamma_{n_s}$ | nonlinear coefficient of $n_s^{th}$ span |
| $\alpha_{n_s}$ | optical power attenuation coefficient of $n_s^{th}$ span. Optical power attenuates as exp $(-\alpha_{n_s} z)$. |
| $\beta_{2, n_s}$ | second order dispersion of $n_s^{th}$ span |
| $L_{s, n_s}$ | span length for $n_s^{th}$ span |

-continued

| | |
|---|---|
| $L_{\text{eff}, n_s}$ | effective length for $n_s^{th}$ span |
| $B_{ch}$ | probe channel bandwidth |

According to Eq. (100) of Poggiolini, Pleriuigi, et al. "A detailed analytical derivation of the GN model of noxa-linear interference in coherent optical transmission systems." arXiv preprint arXiv:1209.0394 (2012), the nonlinear power spectrum density from SCI for total $N_s$ spans for central channel is (derivation is in § 5.1).

$$G(f) = \frac{16}{27} \int\int_{-\infty}^{\infty} g(f_1)g(f_2)g(f_1+f_2-f)H_{N_s}(f_1,f_2,f)df_1 df_2 \quad (5.1)$$

$$H_{N_s}(f_1,f_2,f) = \left|\sum_{n_s=1}^{N_s} \gamma_{n_s} P_{n_s} P_{N_s}'^{\frac{1}{2}} \exp[j\phi_{n_s}(f_1,f_2,f)] \times \xi_{n_s}(f_1,f_2,f)\right|^2 \quad (5.2)$$

$$\phi_{n_s}(f_1,f_2,f) = 4\pi^2(f_1-f)(f_2-f)\sum_{n_s'=1}^{n_s-1} \beta_{2,n_s'} L_{s,n_s'} \quad (5.3)$$

$$\xi_{n_s}(f_1,f_2,f) = \frac{1-\exp(-\alpha_{n_s}L_{s,n_s})\exp(j4\pi^2(f_1-f)(f_2-f)\beta_{2,n_s}L_{s,n_s})}{\alpha_{n_s} - j4\pi^2(f_1-f)(f_2-f)\beta_{2,n_s}} \quad (5.4)$$

where $\phi_{n_s}(f_1, f_2, f)$ is accumulated walk-off effect from the beginning of link to the beginning of $n^{th}$ span. In particular, $\phi_1(f_1, f_2, f)=0$. $g(f)$ is the normalized PSD for probe channel. $\xi_{n_s}(f_1, f_2, f)$ is four-wave-mixing efficient for each span.

$H_{N_s}(f_1, f_2, f)$ in Eq. 5.2 can be written as:

$$H_{N_s}(f_1,f_2,f) = \quad (5.5)$$

$$\left(\sum_{n_s=1}^{N_s} \gamma_{n_s} P_{n_s} P_{N_s}'^{\frac{1}{2}} \exp[j\phi_{n_s}(f_1,f_2,f)] \times \xi_{n_s}(f_1,f_2,f)\right)$$

$$\left(\sum_{n_s=1}^{N_s} \gamma_{n_s} P_{n_s} P_{N_s}'^{\frac{1}{2}} \exp[j\phi_{n_s}(f_1,f_2,f)] \times \xi_{n_s}(f_1,f_2,f)\right)^*$$

Thus, the contribution for $N_s^{th}$ span can be expressed as:

$$\Delta H(f_1, f_2, f) = \quad (5.6)$$

$$H_{N_s}(f_1,f_2,f) - H_{N_s-1}(f_1,f_2,f) = A_{N_s}(f_1,f_2,f)\exp[j\phi_{N_s}(f_1,f_2,f)]$$

$$\sum_{n_s=1}^{N_s-1} A_{n_s}^*(f_1,f_2,f)\exp[-j\phi_{n_s}(f_1,f_2,f)] + A_{N_s}^*(f_1,f_2,f)$$

$$\exp[-j\phi_{N_s}(f_1,f_2,f)]\sum_{n_s=1}^{N_s-1} A_{n_s}(f_1,f_2,f)\exp[j\phi_{n_s}(f_1,f_2,f)] +$$

$$|A_{N_s}(f_1,f_2,f)|^2 = 2|A_{N_s}(f_1,f_2,f)|\sum_{n_s=1}^{N_s-1}|A_{n_s}(f_1,f_2,f)|$$

$$\cos[\phi_{N_s}(f_1,f_2,f) - \phi_{n_s}(f_1,f_2,f) + \theta_{N_s} - \theta_{n_s}] + |A_{N_s}(f_1,f_2,f)|^2$$

$$A_{n_s}(f_1,f_2,f) = \gamma_{n_s} P_{n_s} P_{N_s}'^{\frac{1}{2}} \xi_{n_s}(f_1,f_2,f) \quad (5.7)$$

where $\theta_{n_s}$ is angle of $A_{n_s}(f_1, f_2, f)$. When the Chromatic Dispersion (CD) is large enough, $$\theta_{n_s} \approx \theta_{N_s} \approx -\frac{\pi}{2}$$

Then $$\Delta H(f_1, f_2, f) = 2|A_{N_s}(f_1, f_2, f)| \quad (5.8)$$

$$\sum_{n_s=1}^{N_s-1} |A_{n_s}(f_1,f_2,f)|\cos[\phi_{N_s}(f_1,f_2,f) - \phi_{n_s}(f_1,f_2,f)] +$$

$$|A_{N_s}(f_1,f_2,f)|^2$$

where the first term is the coherent contribution and second term is the SCI incoherent contribution of $N_s^{th}$ span. Put Eq. (5.8) into the Eq. (5.1), the coherent contribution of $N_s^{th}$ span is as followed:

$$G_{N_s}^{co}(f) = \frac{32}{27} \int\int_{-\infty}^{\infty} g(f_1)g(f_2)g(f_1+f_2-f)A_{N_s}(f_1,f_2,f) \quad (5.9)$$

$$\sum_{n_s=1}^{N_s-1} |A_{n_s}(f_1,f_2,f)|\cos[\phi_{N_s}(f_1,f_2,f) - \phi_{n_s}(f_1,f_2,f)]df_1 df_2 \approx$$

$$\sum_{n_s=1}^{N_s-1} \sqrt{B_{n_s,N_s}(f) C_{n_s,N_s}(f)}$$

$$B_{n_s,N_s}(f) = \frac{32}{27}\int\int_{-\infty}^{\infty} g(f_1)g(f_2)g(f_1+f_2-f) \quad (5.10)$$

$$|A_{n_s}(f_1,f_2,f)|^2 \cos[\phi_{N_s}(f_1,f_2,f) - \phi_{n_s}(f_1,f_2,f)]df_1 df_2$$

$$C_{n_s,N_s}(f) = \frac{32}{27}\int\int_{-\infty}^{\infty} g(f_1)g(f_2)g(f_1+f_2-f) \quad (5.11)$$

$$|A_{n_s}(f_1,f_2,f)|^2 \cos[\phi_{N_s}(f_1,f_2,f) - \phi_{n_s}(f_1,f_2,f)]df_1 df_2$$

If the signal spectrum is assumed to be rectangular, $g(f)=1/B_{ch}$. Following the FWM efficiency assumption as Eq. (36), Appendix F in Poggiolini, Pierluigi. "The GN model of non-linear propagation in uncompensated coherent optical systems." Journal of Lightwave Technology 30.24 (2012): 3857-3879, $$B_{n_s,N_s}(f) = \frac{32}{27}\frac{\gamma_{n_s}P_{n_s}P_{N_s}'L_{\text{eff},n_s}^2}{B_{ch}^3}\int\int_{-\infty}^{\infty}\frac{1}{1+16\pi^4\beta_{2,n_s}^2 f_1^2 f_2^2/\alpha_{n_s}^2} \quad (5.12)$$

$$\cos[\phi_{N_s}(f_1,f_2,f) - \phi_{n_s}(f_1,f_2,f)]df_1 df_2$$

$$C_{n_s,N_s}(f) = \frac{32}{27}\frac{\gamma_{N_s}^2 P_{N_s}^2 P_{N_s}' L_{\text{eff},n_s}^2}{B_{ch}^3}\int\int_{-\infty}^{\infty}\frac{1}{1+16\pi^4\beta_{2,N_s}^2 f_1^2 f_2^2/\alpha_{N_s}^2} \quad (5.13)$$

$$\cos[\phi_{N_s}(f_1,f_2,f) - \phi_{n_s}(f_1,f_2,f)]df_1 df_2$$

Following a similar derivation method of Poggiolini, Pierluigi. "The GN model of non-linear propagation in uncompensated coherent optical systems." Journal of Lightwave Technology 30.24 (2012): 3857-3879, appendix H, one obtains $$B_{N_s}(0) \approx \frac{16}{27}\frac{\gamma_{n_s}L_{\text{eff},n_s}^2 P_{n_s}^2 P_{N_s}'}{\pi \tau_{CD,n_s} B_{ch}^3} \quad (5.14)$$

$$C_{N_s}(0) \approx \frac{16}{27}\frac{\gamma_{N_s}^2 L_{\text{eff},N_s}^2 P_{N_s}^2 P_{N_s}'}{\pi \tau_{CD,n_s} B_{ch}^3} \quad (5.15)$$

where $\tau_{CD,n_s} = \sum_{k=n_s}^{N_s-1} \beta_{2,k} L_{s,k}$ is the accumulated CD difference between $N_s^{th}$ span and $n_s^{th}$ span. As a result, coherent contribution of $N_s^{th}$ span is as follows $$G_{N_s}^{cc}(0) = \frac{16}{27} \frac{P'_{N_s} \gamma_{N_s} L_{eff,N_s} P_{N_s}}{\pi B_{ch}^3} P_{N_s} \sum_{n_s=1}^{N_s-1} \frac{\gamma_{n_s} L_{eff,n_s} P_{n_s}}{\tau_{CD,n_s}} \quad (5.16)$$

The coherent NSR for $N^{th}$ span only is $$NSR_{NL,N}^{cc} = \frac{16}{27} \frac{\gamma_{N_s} L_{eff,N_s} P_{N_s}}{\pi B_{ch}^2} \sum_{n_s=1}^{N_s-1} \frac{\gamma_{n_s} L_{eff,n_s} P_{n_s}}{\tau_{CD,n_s}} \quad (5.17)$$

§ 5.1 Appendix—Heterogenous GN Derivation and Simplification

The PSD at the beginning of $n_s^{th}$ span is $$G_{sig,n_s}(f) = P_{n_s}(1)g(f,1) + P_{n_s}(2)g(f,2) + \ldots + P_{n_s}(N_{ch})g(f, N_{ch}) \quad (5.A.1)$$

The corresponding amplitude of electric field is $$\sqrt{G_{sig,n_s}(f)} = \sqrt{P_{n_s}(1)g(f,1)} + \sqrt{P_{n_s}(2)g(f,2)} + \ldots + \sqrt{P_{n_s}(N_{ch})g(f,N_{ch})} \quad (5.A.2)$$

Where $P_{n_s}(m)$ is the power for channel m at the beginning of $n_s$. And one has $\int_{-\infty}^{\infty} g(f,m) = 1$ for the normalized PSD for $m^{th}$ channel. We have $g(f,m)g(f,n) = 0$ if $m \neq n$.

Consequently, if ignoring the double integration, FM term, summation over span and square operator, and only considering applying the first product of sequence in Eq. (100), from Poggiolini, Pierluigi, et al. "A detailed analytical derivation of the GN model of non-linear interference in coherent optical transmission systems." arXiv preprint arXiv:1209.0394 (2012.), to obtain $$E_{n_s}(f) = \quad (5.A.3)$$

$$\prod_{n'_s=1}^{n_s-1} \sqrt{G_{Tx}(f_1)G_{Tx}(f_2)G_{Tx}(f_1+f_2-f)\Gamma_{n'_s}^3 \exp(-3\alpha_{n'_s}L_{n'_s})} =$$

$$\prod_{n'_s=1}^{n_s-1} \sqrt{G_{Tx}(f_1)\Gamma_{n'_s}\exp(-\alpha_{n'_s}L_{n'_s})} \sqrt{G_{Tx}(f_2)\exp(-\alpha_{n'_s}L_{n'_s})}$$

$$\sqrt{G_{Tx}(f_1+f_2-f)\Gamma_{n'_s}\exp(-\alpha_{n'_s}L_{n'_s})} = \sqrt{G_{sig,n_s}(f_1)}\sqrt{G_{sig,n_s}(f_2)}$$

$$\sqrt{G_{sig,n_s}(f_1+f_2-f)} = \sum_{m_1=1}^{N_{ch}} \sqrt{P_{n_s}(m_1)g(f_1,m_1)}$$

$$\sum_{m_2=1}^{N_{ch}} \sqrt{P_{n_s}(m_2)g(f_1,m_2)} \sum_{m_3=1}^{N_{ch}} \sqrt{P_{n_s}(m_3)g(f_1,m_3)}$$

where $\Gamma_{n'_s}$ is the gain of $n'_s$ span.

The above expression is the beating term from three pumps. In this coherent model, only consider the coherent contribution from probe channel, which means only the coherent contribution of self-channel interference (SCI) is considered, Eq. (5.A.3) can be simplified as $$E(f, n_s) \approx \quad (5.A.4)$$

$$\sum_{m=1}^{N_{ch}} \sqrt{P_{n_s}(m)g(f_1,m)} \sqrt{P_{n_s}(m)g(f_2,m)} \sqrt{P_{n_s}(m)g(f_1+f_2-f,m)} =$$

$$\sum_{m=1}^{N_{ch}} P_{n_s}(m)^{3/2} \sqrt{g(f_1,m)} \sqrt{g(f_2,m)} \sqrt{g(f_1+f_2-f,m)}$$

Applying the second product of sequence in Eq. (100), Poggiolini, Pierluigi, et al. "A detailed analytical derivation of the GN model of non-linear interference in coherent optical transmission systems," arXiv preprint arXiv: 1209.0394 (2012).

$$(f, n_s) \prod_{n'_s=n_s}^{N_s} \Gamma_{n'_s}^{\frac{1}{2}} \exp\left(-\frac{\alpha_{n'_s}L_{n'_s}}{2}\right) = \quad (5.A.5)$$

$$\sum_{m=1}^{N_{ch}} P_{n_s}(m)^{\frac{3}{2}} \sqrt{g(f_1,m)} \sqrt{g(f_2,m)} \sqrt{g(f_1+f_2-f,m)}$$

$$\prod_{n'_s=n_s}^{N_s} \Gamma_{n'_s}^{\frac{1}{2}} \exp\left(-\frac{\alpha_{n'_s}L_{n'_s}}{2}\right) =$$

$$\sum_{m=1}^{N_{ch}} P_{n_s}(m)^{\frac{3}{2}} \frac{P_{N_s}^{\frac{1}{2}}(m)\Gamma_{N_s}^{\frac{1}{2}} \exp\left(-\frac{\alpha_{N_s}L_{N_s}}{2}\right)}{P_{n_s}(m)^{\frac{1}{2}}} \sqrt{g(f_1,m)} \sqrt{g(f_2,m)}$$

$$\sqrt{g(f_1+f_2-f,m)} = \sum_{m=1}^{N_{ch}} P_{n_s}(m) P_{N_s}^{1/2}(m) \Gamma_{N_s}^{\frac{1}{2}} \exp(-\alpha_{N_s}L_{N_s}/2)$$

$$\sqrt{g(f_1,m)} \sqrt{g(f_2,m)} \sqrt{g(f_1+f_2-f,m)}$$

As a result, if we only consider the nonlinearity for a certain probe channel and remove the channel index, $$G(f) = \frac{16}{27} \iint_{-\infty}^{\infty} g(f_1)g(f_2)g(f_1+f_2-f)H_N(f_1,f_2,f)df_1 df_2 \quad (5.A.6)$$

$$H_{N_s}(f_1, f_2, f) = \quad (5.A.7)$$

$$\left| \sum_{n_s=1}^{N_s} \gamma_{n_s} P_{n_s} P_{N_s}^{\prime\frac{1}{2}} \exp[j\phi_{n_s}(f_1,f_2,f)] * \xi_{n_s}(f_1,f_2,f) \right|^2$$

$$P_{N_s}^{\prime\frac{1}{2}} = P_{N_s}^{\frac{1}{2}} \Gamma_{N_s}^{\frac{1}{2}} \exp(-\alpha_{N_s}L_{N_s}/2) \quad (5.A.8)$$

$$\phi_{n_s}(f_1,f_2,f) = 4\pi^2(f_1-f)(f_2-f)\sum_{n'_s=1}^{n_s-1}\beta_{2,n'_s}L_{s,n'_s} \quad (5.A.9)$$

$$\xi_{n_s}(f_1,f_2,f) = \quad (5.A.10)$$

$$\frac{1 - \exp(-\alpha_{n_s}L_{s,n_s})\exp(j4\pi^2(f_1-f)(f_2-f)\beta_{2,n_s}L_{s,n_s})}{\alpha_{n_s} - j4\pi^2(f_1-f)(f_2-f)\beta_{2,n_s}}$$

Where g(f) is the normalized PSD for the probe channel.

§ 6.0 Proposed Incoherent GN Model and Results

In an embodiment, the NLI power spectral density (PSD) at a frequency, f, is calculated using an incoherent GN (IGN) model as follows in equations (6.1)-(6.2):

$$G(f) = \quad (6.1)$$

$$\frac{16}{27} \sum_{k=1}^{N_s} \int_{-\infty}^{\infty}\int_{-\infty}^{\infty} \gamma_k^2 G_{WDM,k}(f_1)G_{WDM,k}(f_2)G_{WDM,k}(f_1+f_2-f)$$

$$\left| \frac{1-e^{-2\alpha_k L_{s,k}}j4\beta_{2,k}L_{s,k}(f_1-f)(f_2-f)}{2\alpha_k - j4\pi^2\beta_{2,k}(f_1-f)(f_2-f)} \right|^2 df_1 df_2$$

where, $N_s$ is the number of total spans. $\beta_{2,k}$, $\gamma_k$, $\alpha_k$ and $L_{s,k}$ are the second-order dispersion coefficient, nonlinear coefficient, field attenuation coefficient and span length for $k^{th}$ span respectively, and $G_{WDM,k}$ is the signal PSD in the $k^{th}$ span.

In typical WDM systems, Self-Channel Interference (SCI) and Cross-Phase Modulation (XPM) are the dominant NLI contributions, see Carena A, Bosco G, Curri V, et al.: 'EGN model of non-linear fiber propagation,' Optics Express, 2014, 22, (13), pp. 16335-62. As a result, the proposed IGN CMC model only takes SCI and XPM into consideration. If one takes the signal and nonlinear noise to be flat over the bandwidth of the channel, the nonlinear NSR in a single span for probe channel n at frequency f is expressed simply as:

$$NSR_{NL,n} = \frac{16}{27} g_m \sum_{m=1}^{N_{ch}} P_m^2 \phi_{m,n} \tag{6.2a}$$

$$\phi_{m,n} = \frac{\gamma_m^2}{B_{ch,m}} \frac{B_{ch,n}}{N_{samp}} \sum_{k=1}^{N_{samp}} \left| \frac{1 - e^{-2\alpha_m L_s} e^{j4\pi^2 \beta_{2,m} L_s f_1(k) f_2(k)}}{\alpha_m - j4\pi^2 \beta_{2,m} f_1(k) f_2(k)} \right|^2 \tag{6.2b}$$

$$|f_1(k) + f_2(k) - (f_m - f_n)| \leq B_{ch,m}/2 \tag{6.2c}$$

where $\phi_{m,n}$ is the normalized NLI coefficient, n and m are probe channel and interfering channel, respectively, $g_m=2$ if $m \neq n$ and $g_m=1$ if $m=n$, $N_{ch}$ is the total number of channels, $B_{ch,m}$, $P_m$ and $f_m$ are bandwidth, launch power and central frequency respectively for channel in, $N_{samp}$ is the number of samples for Quasi-Monte Carlo method, and $(f_1(k),f_2(k))$ is a pair of low-discrepancy random sequences.

An important feature of Equations (6.2) is the separation of the fiber characteristics and power spectrum into the fiber. In many cases, the fiber characteristics on a modeled system do not change, such that $\phi_{m,n}$ need only be evaluated once for a given channel plan. This means the NLI can be evaluated very efficiently on the same fiber or set of fibers with many different launch power profiles using Eq. (6.2a).

The IGN QMC has the same benefits as other IGN model variants, where the contributions from all interfering channels are individually considered on a per span basis. This allows the model to operate on dynamic networks with different channel layouts on different spans, and on heterogeneous links where the fibers in the path have varying properties. The critical difference of the IGN QMC proposed compared with approximate analytic solutions of the IGN model is that it makes fewer assumptions and is thus valid in low span loss regimes, which are common in commercially deployed networks.

Some previous work has shown the application of the standard Monte Carlo method to solve the double integral in the GN model, see Dar R, Feder M, Mecozzi A, et al, Accumulation of nonlinear interference noise in fiber-optic systems, Optics Express, 2014, 22, (12), pp. 14199-211. In the standard Monte Carlo method, $(f_1(k),f_2(k))$ would be a pair selected from a random sequence. The following section compares the standard Monte Carlo integration in the IGN model (IGN MC) with the proposed IGN QMC.

§ 6.1 Results

Figure 8A:
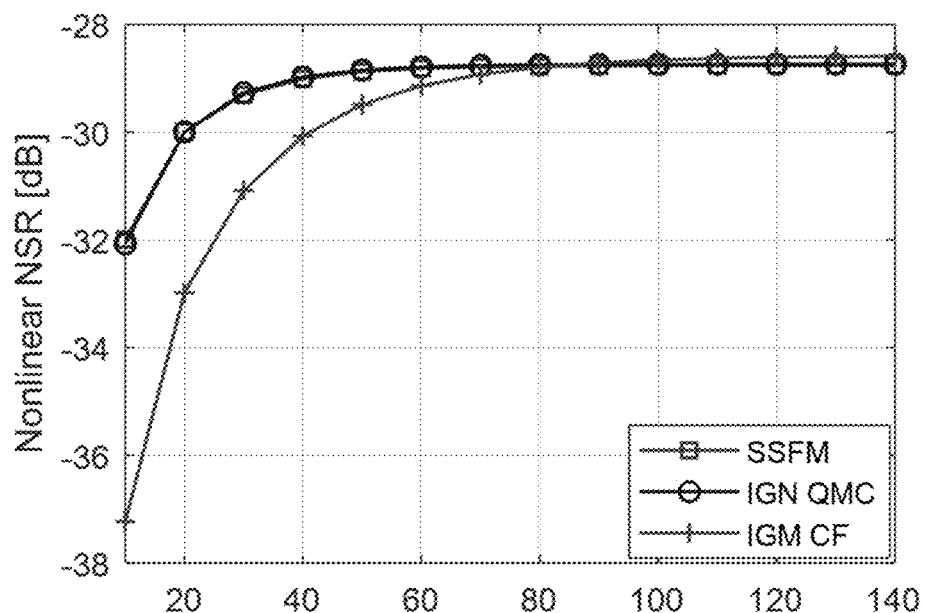
FIGS. 8(a) and 8(b) are graphs of Nonlinear NSR for NDSF (FIG. 8(a)) and TWC (FIG. 8(b)) under different span lengths.
Figure 8B:
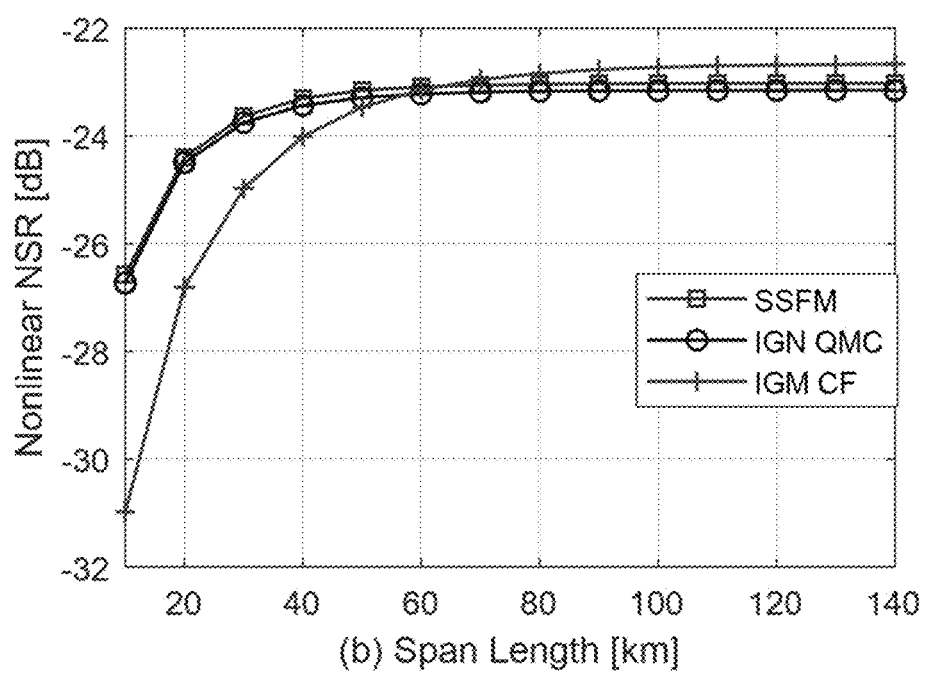

For span length impact, a single-span simulation is used to investigate the impact of span length on the models, as shown in FIGS. 8(a) and 8(b) which are graphs of Nonlinear NSR for NDSF (FIG. 8(a)) and TWC (FIG. 8(b)) under different span lengths. The simulation is of a 9-channel WDM system where each signal is ASE shaped to mimic a 56.8 GBaud transponder. The probe is the central signal located at 1550 nm, and the channel spacing is 75 GHz. The total power in each signal modeled is 3 dBm for non-dispersion shifted fiber (NDSF) and 1 dBm for TrueWave classic (TWC) fiber. The dispersion coefficient, attenuation, and effective area all specified at 1550 nm are 16.8 ps·nm$^{-1}$ km$^{-1}$, 0.2 dB/km and 79.6 um$^{-2}$ for NDSF, respectively, and 2.8 ps·nm$^{-1}$ km$^{-1}$, 0.21 dB/km and 51.7 um$^{-2}$ for TWC, respectively. Dispersion slope is included using a frequency-dependent $\beta_2$ in Equation (6-2b). The IGN CF line is the closed-form IGN model of Eq. (40) in Poggiolini P.: 'The GN model of non-linear propagation in uncompensated coherent optical systems.' Journal of Lightwave Technology, 2012, 30, (24), pp 3857-79, the SSFM line is the split-step Fourier method, and the IGN QMC line is the proposed IGN model.

As shown in FIGS. 8(a) and 8(b), IGN QMC matches well with the SSFM for the ASE signal, while IGN CF has poor performance at shorter span length. The deviation of IGN CF compared to SSFM is around 5 dB for NDSF at 10 km. This discrepancy is expected since the IGN CF is based on an assumption of higher span loss, which results in the inaccuracy at lower span loss. Since IGN QMC accurately solves the GN reference model double integral, the result of IGN QMC is very similar to an SSFM propagating ASE signals over a single span.

Figures 9A, 9B, 9C:
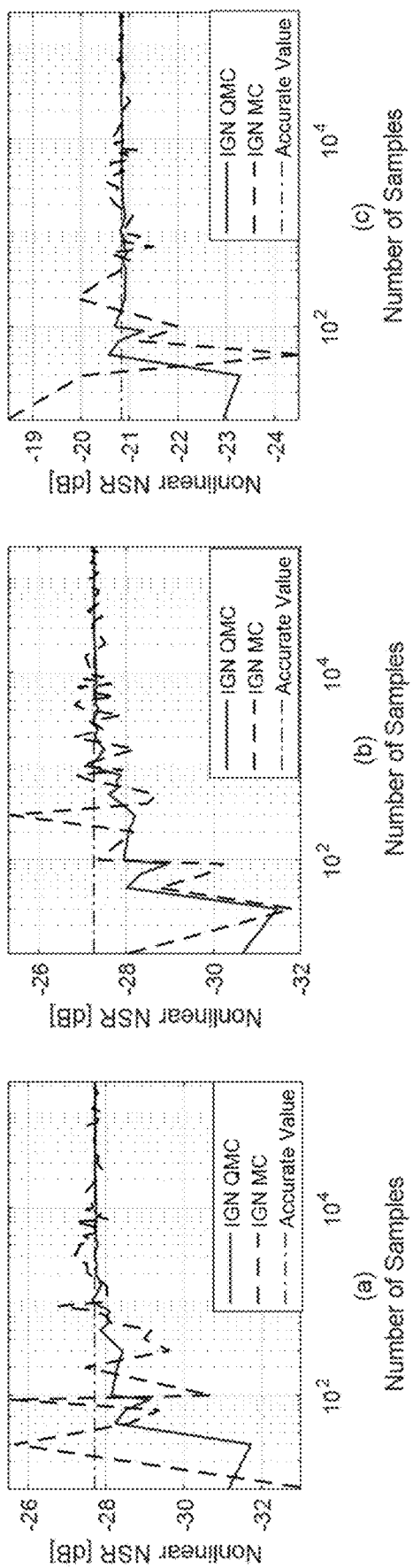
FIGS. 9(a)-9(c) are graphs of the convergence rate of IGN MC and IGN QMC for NDSF with 30 km (FIG. 9(a)), NDSF with 80 km (FIG. 9(b)), and TWO with 80 km (FIG. 9(c))

As described herein, there have been reports of Monte Carlo (MC) methods being used to solve the integration in the GN model. FIGS. 9(a)-9(c) are graphs of the convergence rate of IGN MC and IGN QMC for NDSF with 30 km (FIG. 9(a)), NDSF with 80 km (FIG. 9(b)), and TWC with 80 km (FIG. 9(c)). FIGS. 9(a)-9(c) compare the convergence rate of the IGN MC and the IGN QMC for (a) 30 km of NDSF, (b) 80 km of NDSF, and (c) 80 km of TWC. The simulation is a full C-band WDM system with 64 channels on a 75 GHz channel spacing, where each signal has a width commensurate with 56.8 GBaud transmissions. The probe signal is the central one located at 1547.8 nm. As shown in FIGS. 9(a)-9(c), IGN QMC can achieve convergence much faster than IGN MC. The required number of samples (RNS) for each method to achieve convergence is shown in the following Table 1. Convergence is deemed to be achieved when the nonlinear NSR is within ±0.15 dB of the accurate value.

TABLE 1

Required number of samples for both IGN methods

| Test case | NDSF 30 km | NDSF 80 km | TWC 80 km |
|---|---|---|---|
| RNS of IGN QMC | 2000 | 2000 | 100 |
| RNS of IGN MC | 110000 | 45000 | 30000 |

This demonstrates that the RNS for IGN QMC is up to 300 times less than that of IGN MC. The total calculation time to evaluate the nonlinearity over a single span for all channels in the C-band using MATLAB is shown in Table 2. Note for the proposed IGN QMC, the required timing is the calculation time of NLI the first time for a given span/channel plan. If the link and the channel plan did not change, the required timing could be around 1000 times faster on the subsequent runs. It should be noted that using the built-in integration functions such as trapz or integral in MATLAB requires on the order of minutes to evaluate the nonlinear NSR over C-band. The quasi-Monte Carlo approach shows an improvement of greater than three orders of magnitude even for spans of nominal length. The improvements are stronger for short spans as expected. From these results, one can conclude that the IGN QMC is a good candidate method for real-time nonlinear NSR estimation, especially when shorter span lengths are present.

TABLE 2

Relative timing for both IGN methods over C band

| Test case | NDSF 30 km | NDSF 80 km | TWC 80 km |
|---|---|---|---|
| IGN QMC | 0.2 s | 0.2 s | 0.02 s |
| IGN MC | 8.2 s | 3.4 s | 2.3 s |

Figure 10A:
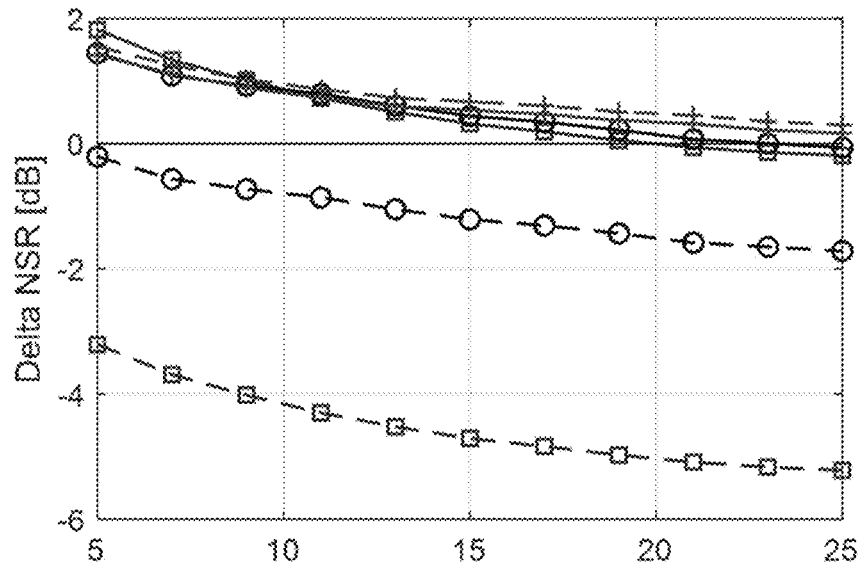
FIGS. 10(a) and 10(b) are graphs of the Delta NSR (the difference between IGN and SSFM) with 16 QAM for NDSF (FIG. 10(a)) and TWC (FIG. 10(b))
Figure 10B:
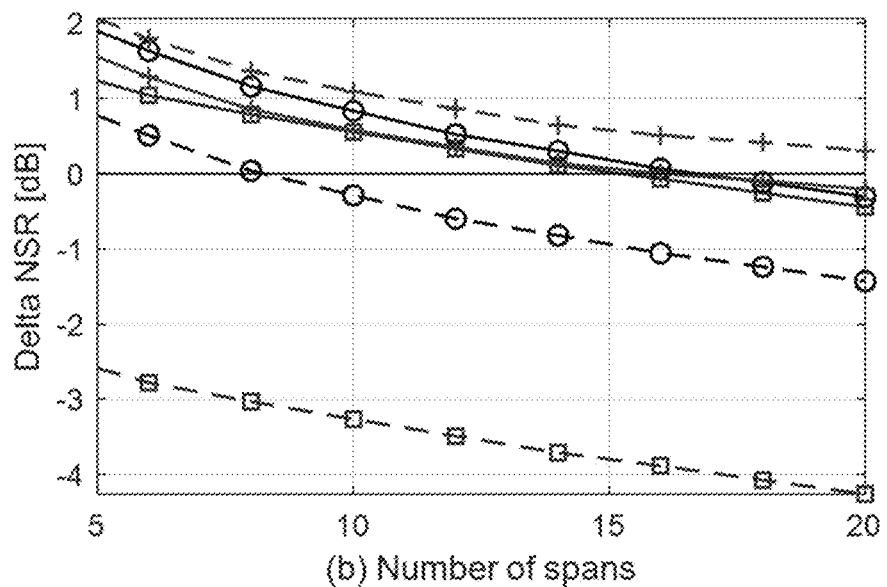

Previous sections compared results for GN propagation as a proxy for actual modulated signals. To investigate the performance of IGN in a real system, a simulation was performed of a 21-channel WDM system transmission with 35 GBaud dual-polarization (DP)-16 QAM signals. The probe channel is located at the central channel with a wavelength of approximately 1550 nm. FIGS. 10(a) and 10(b) are graphs of the Delta NSR (the difference between IGN and SSFM) with 16 QAM for NDSF (FIG. 10(a) and TWC (FIG. 10(b)). Delta nonlinear NSR is defined as the difference between IGN QMC (or IGN CF) and SSFM. The total signal powers at the input to each span are 3 dBm for NDSF and 1 dBm for TWO, respectively. As shown in the graph of FIGS. 10(a) and 10(b), the error of IGN QMC compared to SSFM is within 1 dB for all the cases investigated after propagating for ten spans. For IGN CF, when the span length is small, e.g., 10 km and 30 km, it suffers from a large amount of error compared to SSFM. If the span length is increased to 90 km, the accuracy of IGN CF is comparable with IGN QMC.

Compared to the usual IGN model with a closed-form solution, the proposed approach is more accurate for short fibers. In addition, the QMC method shows significantly reduced computation times up to the order of 100 times when compared to a standard Monte-Carlo approach.

Figure 11:
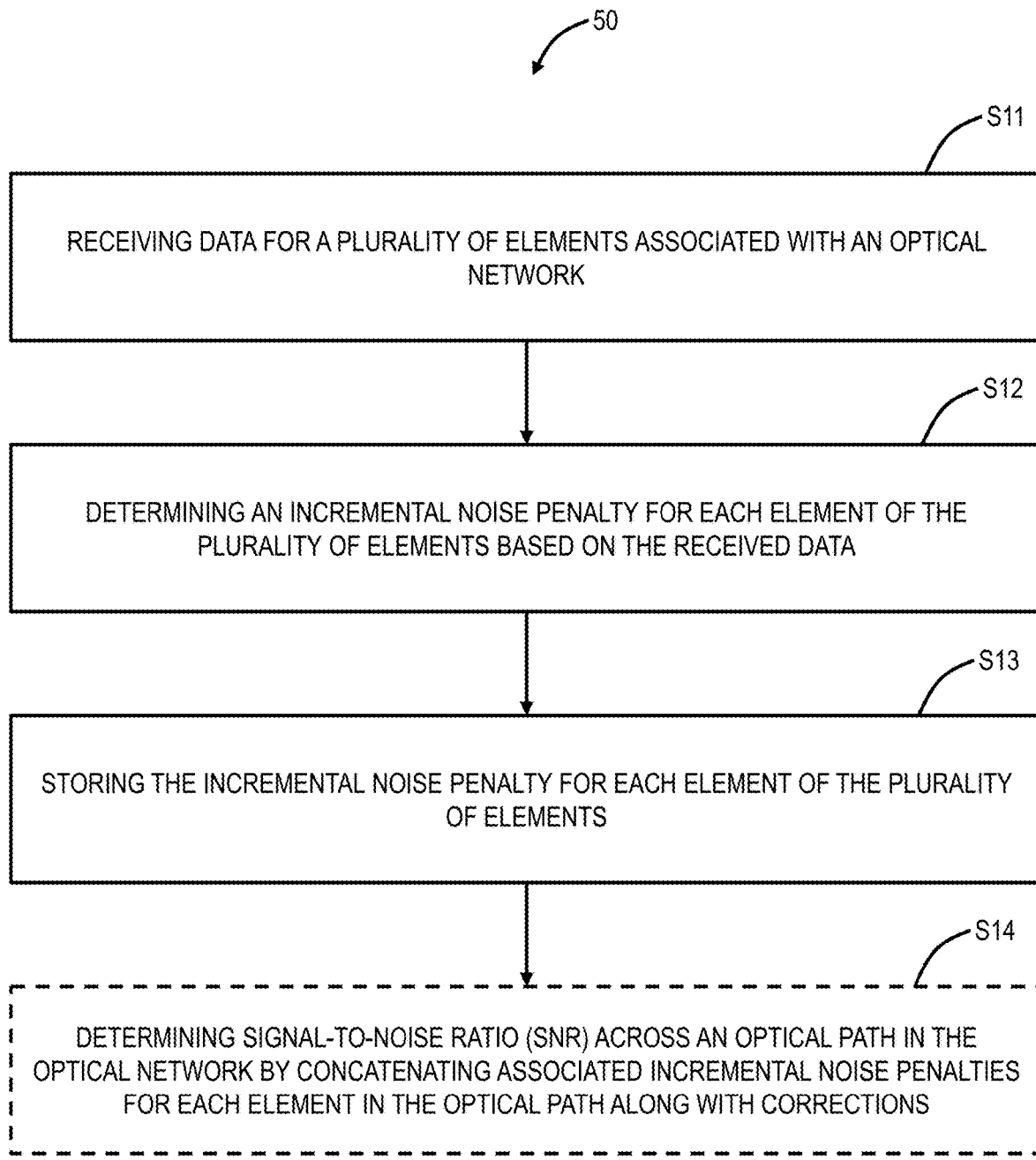
FIG. 11 is a flowchart of a process of utilizing an incremental noise metric for rapid modeling of optical networks.

§ 7.0 Process of Utilizing an Incremental Noise Metric for Rapid Modeling of Optical Networks FIG. 11 is a flowchart of a process 50 of utilizing an incremental noise metric for the rapid modeling of optical networks. The process 50 contemplates implementation as a method, as computer readable code stored in a non-transitory computer-readable storage medium, and via a processing device. The process 50 includes receiving data for a plurality of elements associated with an optical network (step S11); determining an incremental noise penalty for each element of the plurality of elements based on the received data (step S12); and storing the incremental noise penalty for each element of the plurality of elements (step S13). The process 50 can further include determining Signal-to-Noise Ratio (SNR) across an optical path in the optical network by concatenating associated incremental noise penalties for each element in the optical path along with corrections (step S14).

The corrections can be for upstream incremental noise penalties for elements upstream from the associated element, such as described in §§ 3.0-4.0. The SNR can be determined in real-time based on utilizing stored incremental noise penalties. The SNR for the optical path can be utilized as a cost metric in path computation. The process 50 can further include utilizing the SNR for the optical path to determine if any of a pre-planned restoration route for an optical channel and a new route for a new optical channel is currently viable. The process 50 can further include identifying sections in the optical network that need maintenance or repair based on monitoring associated incremental noise penalties. The process 50 can further include periodically performing the obtaining, the determining, and the storing; and monitoring the associated incremental noise penalties over time.

§ 7.1 Other Applications

The incremental noise penalties and SNR can be visually presented in various format for example, reporting the information in plain text or another encoded format which may be less usable to an end-user but useful for higher level machine applications.

In an embodiment, the incremental noise penalties can be used in routing and path computation, such as "SNR-based routing": Determining [new] paths which are viable (as opposed to determining viability of a given path) via performance based (SNR or NSR based) routing as opposed to existing approaches which find a path based on other constraints and then check viability. It is also possible to add the incremental SNR into the cost function to ensure that the path found is viable during Routing, Modulation, and Spectrum Assignment (RMSA).

Also, this can be used for noise localization—to determine which discrete elements (amplifiers, spans) or concatenations of them (sections, or otherwise) of a network are giving noteworthy (e.g., high) penalty. This is of use to prioritize repair, maintenance, or replacement of network infrastructure, debug network performance, change route prioritization for planned channels, variable bandwidth restoration (find protect routes with different bandwidth values as working routes), bandwidth optimization applications.

§ 8.0 Example Optical Network

Figure 12:
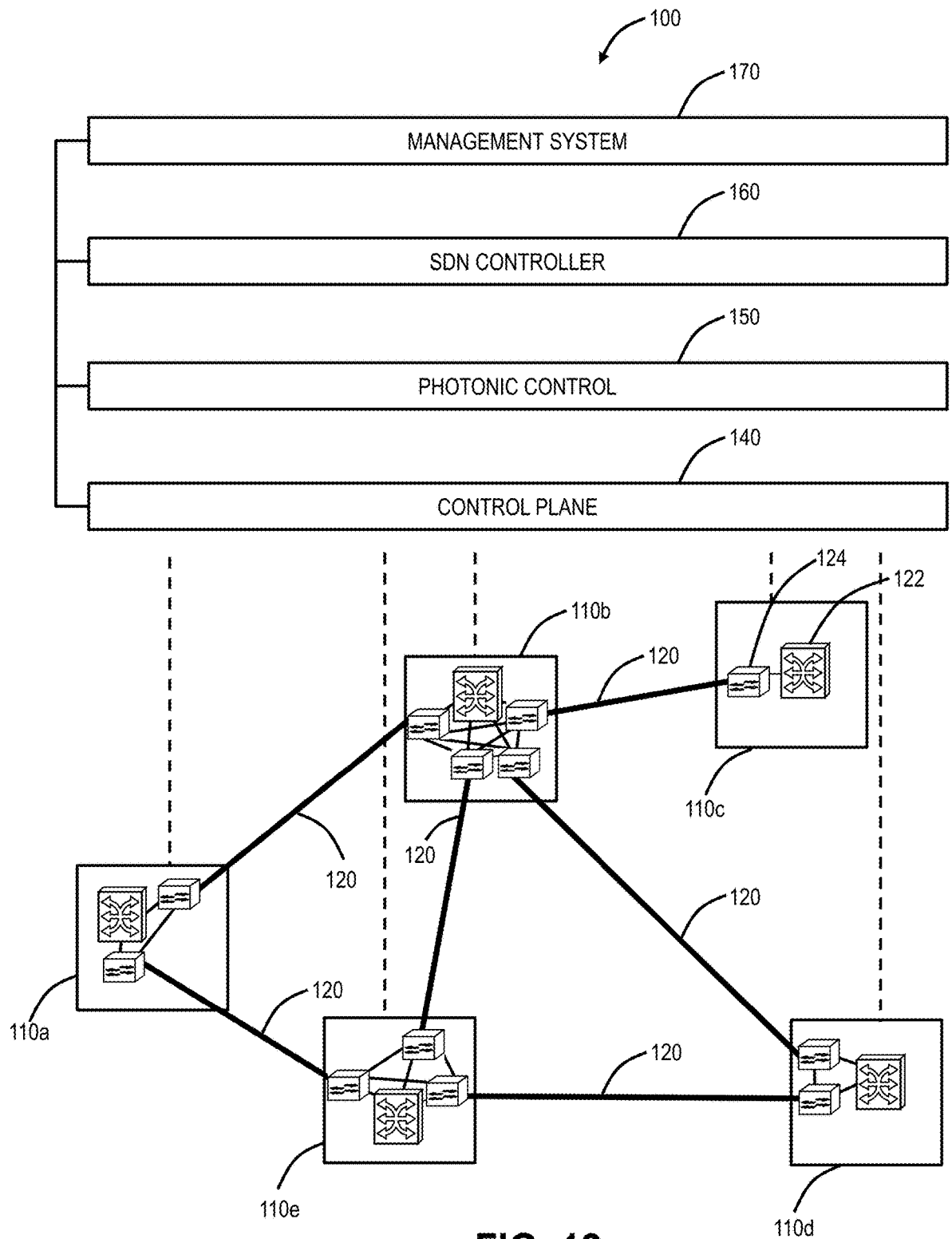
FIG. 12 is a network diagram of an example optical network.

FIG. 12 is a network diagram of a network 100 with five interconnected sites 110a, 110b, 110c, 110d, 110e. The sites 110 are interconnected by a plurality of links 120, i.e., fiber. Each of the sites 110 can include a switch 122 and one or more WDM network elements 124. The switch 122 is configured to provide services at Layers 1 (e.g., Optical Transport Network (OTN)) and/or Layer 2 (e.g., Ethernet, Multiprotocol Label Switching (MPLS)) and/or Layer 3 (e.g., Internet Protocol (IP)) where the switch would normally be called a router. The WDM network elements 124 provide the photonic layer (e.g., Layer 0) and various functionality associated therewith (e.g., multiplexing, amplification, optical routing, wavelength conversion/regeneration, local add/drop, etc.) including photonic control. Of note, while shown separately, those of skill in the art will recognize that the switch 122 and the WDM network elements 124 may be realized in the same network element. For example, a switch 122 can include pluggable transceivers that provide WDM. The photonic layer and the photonic control operating thereon can also include intermediate amplifiers and/or regenerators on the links 120, which are omitted for illustration purposes. The network 100 is illustrated, for example, as an interconnected mesh network, and those of skill in the art will recognize the network 100 can include other architectures, with additional sites 110 or with fewer sites, with additional network elements and hardware, etc. The sites 110 communicate with one another optically over the links 120, and the links 120 between each of the sites 110 are examples of OMS, i.e., sections.

The network 100 includes a control plane 140 operating on and/or between the switches 122 at the sites 110a, 110b, 110c, 110d, 110e. The control plane 140 includes software, processes, algorithms, etc. that control configurable features of the network 100, such as automating the discovery of the switches 122, the capacity of the links 120, port availability on the switches 122, connectivity between ports; dissemination of topology and bandwidth information between the switches 122; calculation and creation of paths for connections; network-level protection and restoration; and the like. Those of ordinary skill in the art will recognize the optical network 100, and the control plane 140 can utilize any type of control plane for controlling the switches 122 and establishing connections.

The optical network 100 can include photonic control 150, which can be viewed as a control algorithm/loop for managing wavelengths/optical spectrum from a physical perspective at Layer 0. In one aspect, the photonic control 150 is configured to add/remove wavelengths/spectrum from the links 120 in a controlled manner to minimize impacts to existing, in-service wavelengths. For example, the photonic control 150 can adjust modem launch powers, optical amplifier gain, Variable Optical Attenuator (VOA) settings, Wavelength Selective Switch (WSS) parameters, etc. The photonic control 150 can also be adapted to perform network optimization on the links 120. This optimization can also include re-optimization where appropriate. In an embodiment, the photonic control 150 can adjust the modulation format, baud rate, frequency, wavelength, spectral width, etc. of optical modems in addition to the aforementioned components at the photonic layer. In an embodiment, the photonic control 150 can include support for capacity mining where the physical parameters are adjusted to provide increased capacity without requiring additional hardware. For both the control plane 140 and the photonic control 150, associated controllers can be either centralized, distributed, or embedded in the network elements. A key aspect of the optical network is the technology is fundamentally analog, and optical performance is subject to various linear and non-linear impairments on the links 120.

The optical network 100 can also include a Software-Defined Networking (SDN) controller 160. SDN allows the management of network services through abstraction of lower-level functionality. This is done by decoupling the system that makes decisions about where traffic is sent (SDN control through the SDN controller 160) from the underlying systems that forward traffic to the selected destination (i.e., the physical equipment in the optical network 100). SDN calls for the ability to centrally program provisioning of forwarding on the optical network 100 for more flexible and precise control over network resources to support new services. The SDN controller 160 is a processing device that has a global view of the optical network 100. Additionally, the SDN controller 160 can include or connect to SON applications which can utilize the data from the SDN controller 160 for various purposes.

A management system 170 can be a processing device that supports Operations, Administration, Maintenance, and Provisioning (OAM&P) functions for the optical network 100. The management system 170 can be referred to as a Network Management System (NMS), an Element Management System (EMS), a Craft Interface (CI), etc. The management system can connect directly to the switches 122 and/or network elements 124, as well as connect through any of the control plane 140, the photonic control 150, the SDN controller 160, etc. The management system 170 can be configured to provide a Graphical User Interfaces (GUI) for visualizing networking functions, as described herein.

The control plane 140, the photonic control 150, the SDN controller 160, the management system 170, or some other server or processing device, as well as a combination thereof, is configured to perform path computation and creation for connections; network-level protection and restoration: and the like. The rapid modeling described herein is advantageous in the context of network management, path computation, and the like.

Routing in the optical network 100 is well known. A path is considered valid for connection setup based on the availability of the switch 122, the links 120, sufficient bandwidth available thereon, and path viability. Photonic networks, i.e., Layer 0 and the wavelength interconnectivity of the WDM network elements 124, introduce additional complexity of successfully setting up a service. This can require that all Layer 0 services are pre-planned and/or managed manually. For example, potential paths for services at the photonic layer can be pre-planned by modeling them offline using a static snapshot of the network state to ensure that the computed paths are optically viable in terms of reach, nonlinear effects, dispersion, wavelength contention/blocking, etc. Here, the engineering ensures that each wavelength placed into service will work in a worst-case SNR. Alternatively, the paths can be computed at run-time. Of course, a combination is possible. The rapid modeling described herein is especially useful in determining path viability at run-time as this approach is real-time.

Figure 13:
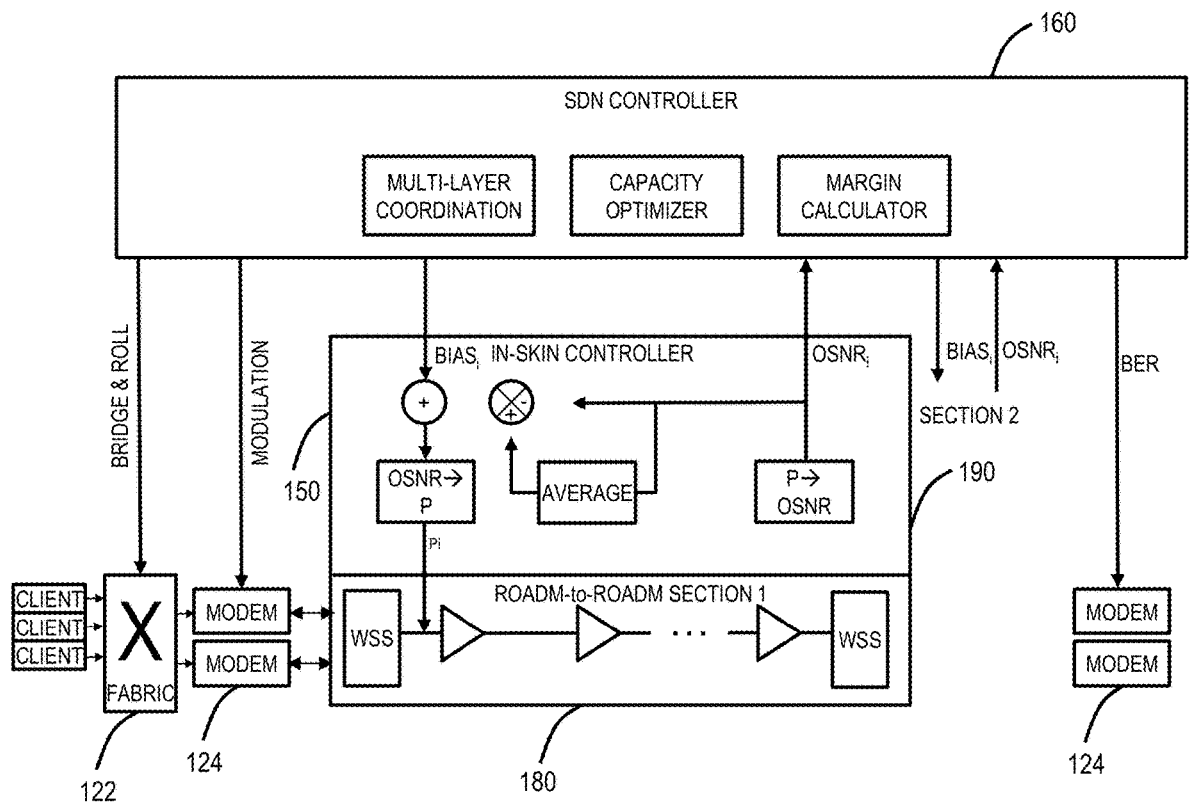
FIG. 13 is a network diagram of another optical network illustrating additional details of photonic control and an SDN controller.

FIG. 13 is a network diagram of another optical network illustrating additional details of the photonic control 150, and the SDN controller 160. The example of FIG. 12 illustrates a switch 122 that connects to a WDM network element 124, which connects to another WDM network element 124 via a ROADM-to-ROADM section 180. The ROADM-to-ROADM section 180 represents a portion of the network 100 between spectrum add/drop points, e.g., ROADMs and can be referred to as the OMS. The photonic control 150 can be an in-skin controller 190, which operates with the SDN controller 160. In-skin means the controller 190 is local with a network element, e.g., a pluggable module in a chassis.

FIG. 13 is a block diagram of a control environment that was used in a field trial and which is applicable to the methods and systems herein. The in-skin controller 190 retrieves the per-channel power measurements, Pi, of channels transiting the section 180 section (a section is all-optical). These per channel measurements are used to estimate the incremental Optical Signal-to-Noise Ratio (OSNR) for each channel, OSNRi. The in-skin controller 190 then attempts to equalize the OSNR of each channel to that of the average of all channels.

§ 9.0 Processing Device

Figure 14:
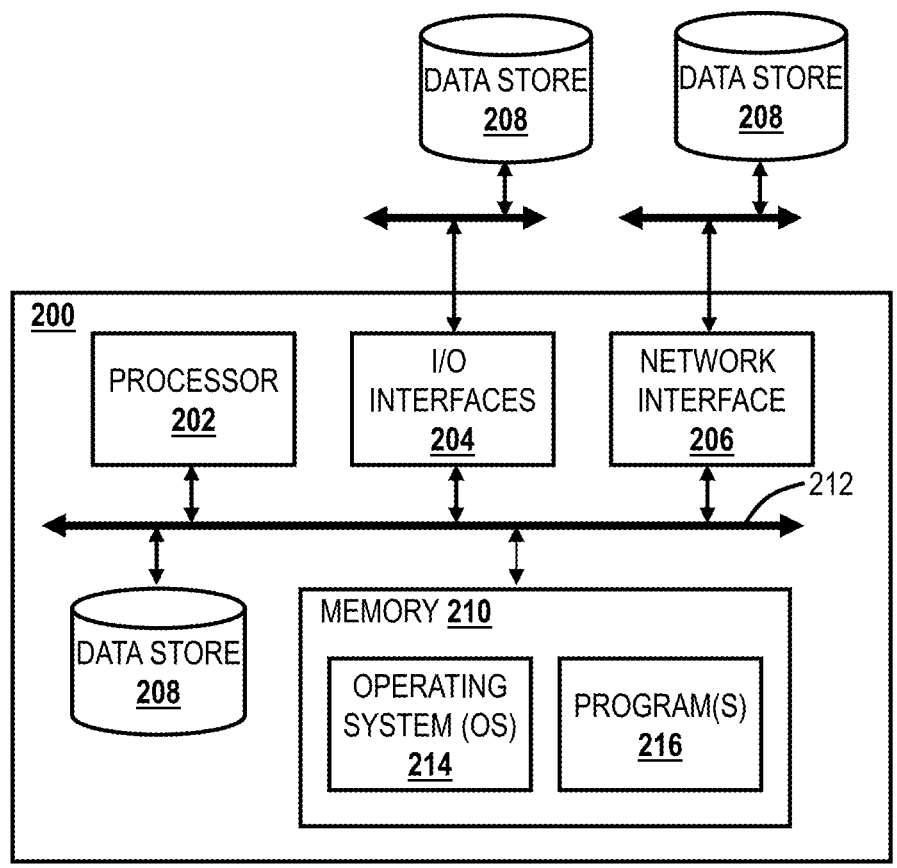
FIG. 14 is a block diagram of a processing device, which may be used to implement the SDN controller, the management system, the in-skin controller, a user device, any of the process described herein, etc.

FIG. 14 is a block diagram of a processing device 200, which may be used to implement the SDN controller 160, the management system 170, the in-skin controller 190, a user device, etc. In the systems and methods described herein, the processing device 200 can be used to present a User Interface (UI) or Graphical UI (GUI) to an operator for implementing part of all of the various processes described herein. The processing device 200 may be a digital computer that, in terms of hardware architecture, generally includes a processor 202, input/output (I/O) interfaces 204, a network interlace 206, a data store 208, and memory 210. It should be appreciated by those of ordinary skill in the art that FIG. 14 depicts the processing device 200 in an oversimplified manner, and practical embodiments may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interlace 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory 210, to communicate data to and from the memory 210, and to generally control operations of the processing device 200 pursuant to the software instructions. The I/O interfaces 204 may be used to receive user input from and/or for providing system output to one or more devices or components.

The network interface 206 may be used to enable the processing device 200 to communicate over a network, such as the Internet, a wide area network (WAN), a local area network (LAN), and the like, etc. The network interface 206 may include, for example, an Ethernet card or adapter or a wireless local area network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the processing device 200, such as, for example, an internal hard drive connected to the local interface 212 in the processing device 200. Additionally, in another embodiment, the data store 208 may be located external to the processing device 200, such as, for example, an external hard drive connected to the I/O interfaces 204 (e.g., SCSI or USB connection). In a further embodiment, the data store 208 may be connected to the processing device 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

The processing device 200 can be connected to the OAM&P communication network in the network 100, such as via the network interface 206. This connection provides a conduit through which the hardware in the network 100 can be programmed following instructions from the SDN controller 160, the control plane 140, and/or the photonic control 150. The connection further enables the processing device 200 to obtain data from the optical network 100 for use in the processes described herein.

Also, it will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, one or more processors, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc, as described herein for the various embodiments.

§ 10.0 Photonic Performance Visualization Use Case

Network management is key to operating networks to perform various functions such as fault analysis, performance management, service provisioning, network device provisioning, maintaining the Quality of Service (QoS), Operations, Administration, Maintenance, and Provisioning (OAM&P), and the like. Generally, network management solutions are provided through Network Management Systems (NMS), Element Management Systems (EMS), Craft Interface (CI), etc. via Graphical User Interfaces (GUI) for visualizing networking functions. Optical networks provide the physical layer that interconnects nodes (also referred to as network elements) to one another. For network operation, it is critical to present a visualization of optical network operation for operators to understand the current situation, proactively address problems, ensure restoration paths are available, etc. For example, a description of a GUI and network visualizations are described in commonly-assigned U.S. patent application Ser. No. 16/022,367, entitled "Multi-layer optical network management graphical user interface and visualizations," the contents of which are incorporated herein by reference.

Conventional GUIs for optical networks provide real-time visibility into network performance and provide visibility into the efficiency of the networks. However, metrics associated with optical networks are complex, especially to visualize for operators. Optical networks in operation experience failures such as, for example, fiber cuts, equipment failures, etc., and, responsive to such failures, the network is configured to reroute services on restoration paths. Various approaches are known in the art. It is critical for proper network operation to understand the availability of restoration paths.

The present disclosure relates to systems and methods for proactively detecting failures on restoration paths in an optical network and visualizations thereof. Variously, the present disclosure includes additional visualizations in terms of optical performance, such as, a) localization to visualize which sections or spans are large noise contributors, b) what-if scenarios to monitor delivered Signal-to-Noise Ratio (SNR) of paths, and c) SNR-based routing to enable path calculation. Specifically, the present disclosure includes determination and visualization of the optical performance of fiber spans and Reconfigurable Optical Add/Drop Multiplexer (ROADM)-ROADM domains in the network regardless of whether they are carrying traffic in order to highlight underperforming links in a proactive way. This is accomplished by measuring the current SNR margin on each and comparing it to a planned SNR at the time the network was planned. This SNR margin and associated categorization are available when interrogating individual fiber spans or ROADM domains but also summarized networkwide on a dashboard to help the user proactively assess trouble spots in the network.

The present disclosure provides a visualization of the absolute performance of spans and sections. This visualization could be used to prioritize routing, to determine network health, etc. For example, the visualization, i.e., GUI, provides insight into which restoration paths may have issues due to degradation in SNR for the end-to-end path. By examining the restoration path overlaid on the spans, it is possible to determine localization as to which spans are causing an issue.

Fibers and ROADM domains are applied a "heat" graphical treatment (graded color scale) on a network map to help the user visualize where underperforming, or indeed overperforming links exist in the network. Once users investigate a particular underperforming fiber span, they can view relevant associated optical characteristics about the links in context. These include measured minimum SNR and planned SNR, the average measured SNR, measured latency, and measured chromatic dispersion, distance, and fiber type. These are helpful to further characterize the state of the fiber and may be helpful in explaining the measured SNR.

The SNR margin measurements are also used to evaluate the expected performance/viability of restoration paths in a photonic control plane network. Previous applications have focused on the transceiver to transceiver paths using measured line SNR, which only applies for currently active traffic, With the ability to look at other photonic paths, regardless if they are carrying traffic, this gives the user the ability to proactively determine if that path will be viable. Highlighting to users which photonic services have restoration paths that will not turn up because they are not viable enables network operators to proactively address these "silent failures" before a network restoration occurs and avoid an outage. The visualization graphically portrays each service with a visual representation of all paths and whether it is viable or not based on the SNR margin. This can be further differentiated from a path's unavailability due to a more temporary cause, such as a network fault (e.g., red versus crossed-out in the visualization).

This list of paths can be presented in order of restoration preference so that the network operator can evaluate the level of risk—if the path that is next in line for restoration is no longer viable, an outage will occur, whereas if the problematic path is further away from the currently active path (e.g., marked in green), it is less likely to be encountered soon and gives more time to address the situation. Note, the use of such visualizations is presented for restoration paths as an example, a similar calculation can be made on demand for any photonic path, independent of whether it is carrying traffic or not. This could be used by network planners to evaluate paths on demand for network planning or provisioning purposes based on real, measured data as opposed to planning data, which may very well be stale and no longer accurate.

FIGS. 15-23 are various screenshots of visualizations for photonic performance. In various embodiments, the screenshots are provided via the management system 170, via the processing device 200, as instructions stored in a non-transitory computer-readable medium, via a computer-implemented method, and the like. The screenshots can visually provide photonic performance based on the various techniques described herein. The visualizations present optical layer performance information for an optical network, such as the optical network 100. Those of ordinary skill in the art will recognize that UIs can include various screens, windows, tiles, pop-ups, etc. and the various screenshots presented herein are for illustration purposes, and other embodiments are contemplated consistent with the descriptions presented herein. The screenshots contemplate use by a network operator, such as in a Network Operations Center (NOC) or the like, for performing OAM&P functions with respect to the optical network 100.

Figure 15:
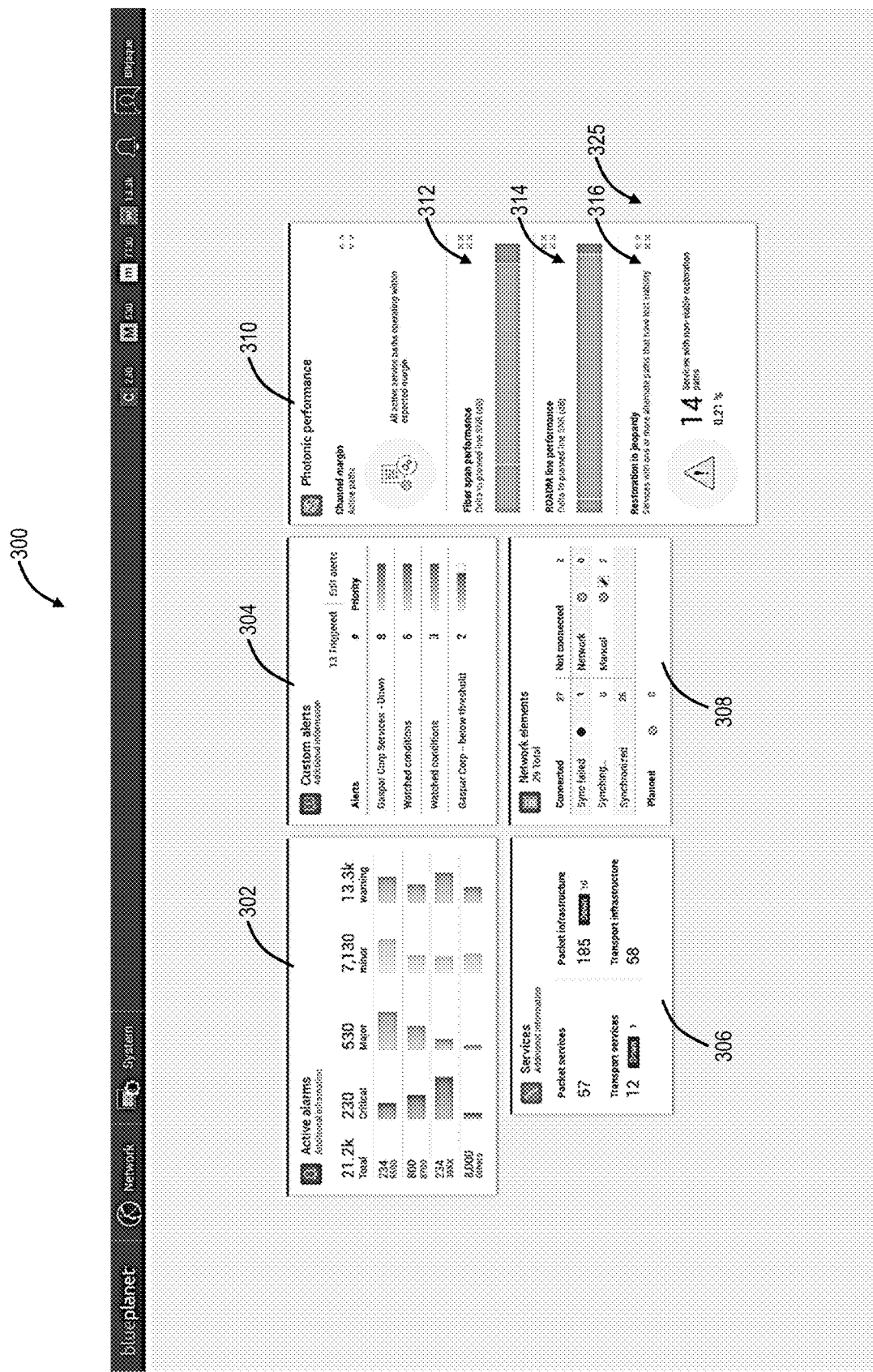
FIG. 15 is a screenshot of a photonic performance dashboard.

FIG. 15 is a screenshot of a photonic performance dashboard 300. The photonic performance dashboard 300 includes example tiles 302, 304, 306, 308, 310. For example, the tile 302 includes active alarms in the optical network 100, the tile 304 includes custom alerts in the optical network 100, the tile 306 includes services provisioned in the optical network 100, and the tile 308 includes a number of network elements in the optical network 100 currently under the management of the management system.

The tile 310 provides photonic performance data. This includes a graphic stating all active service paths are operating within the expected margin. The tile 310 also includes a visualization 312 of fiber span performance, which is a bar graph displaying deltas from planned SNR (positive, nominal, or negative). The tile 310 also includes a visualization 314 for ROADM line performance that is similar to the visualization 312. Finally, the tile 310 includes a visualization 316 illustrating restoration in jeopardy. This displays a number of services that have non-viable restoration paths.

Figure 16:
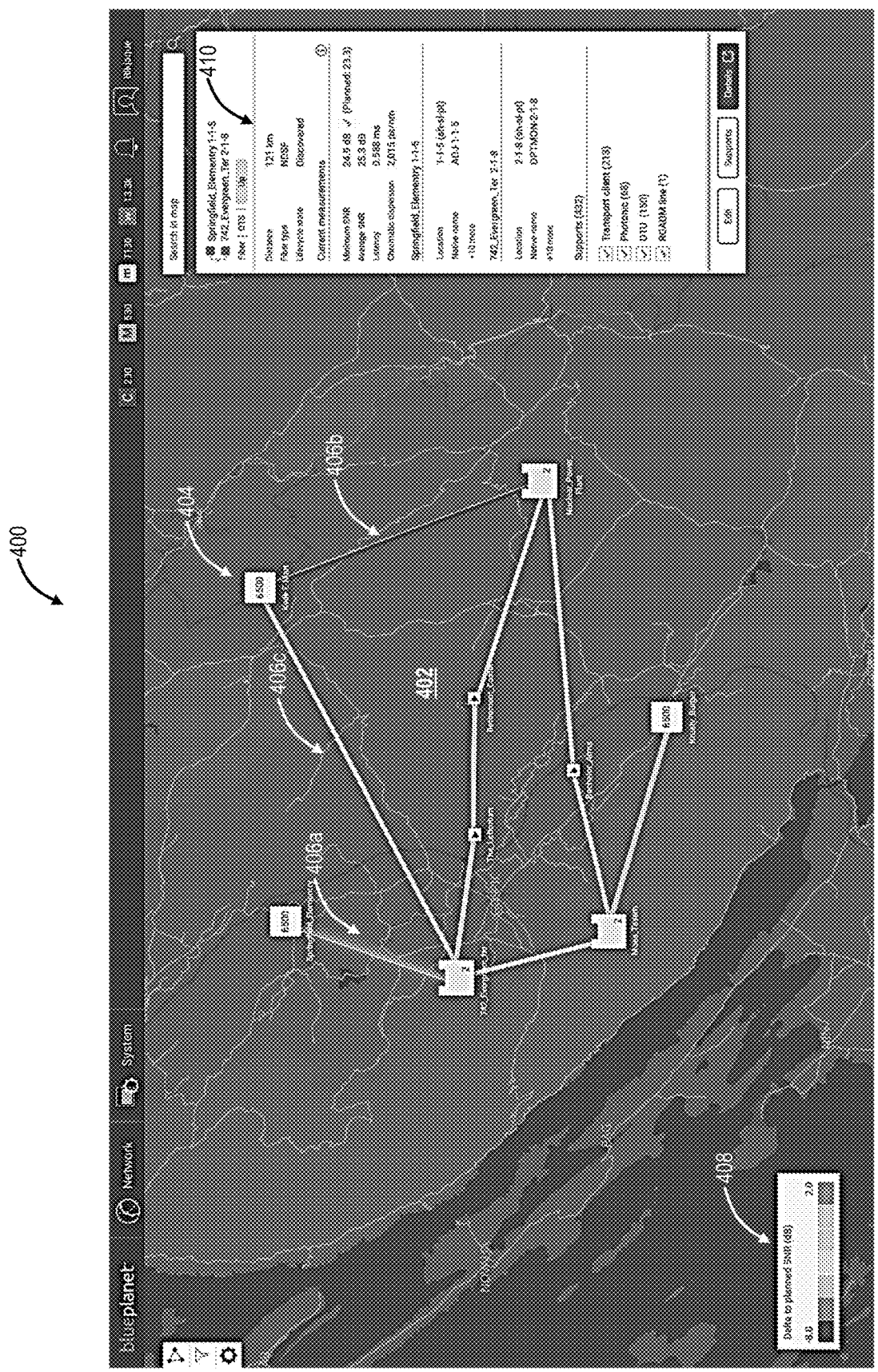
FIGS. 16-18 are screenshots of a fiber span performance map, illustrating various features.
Figure 17:
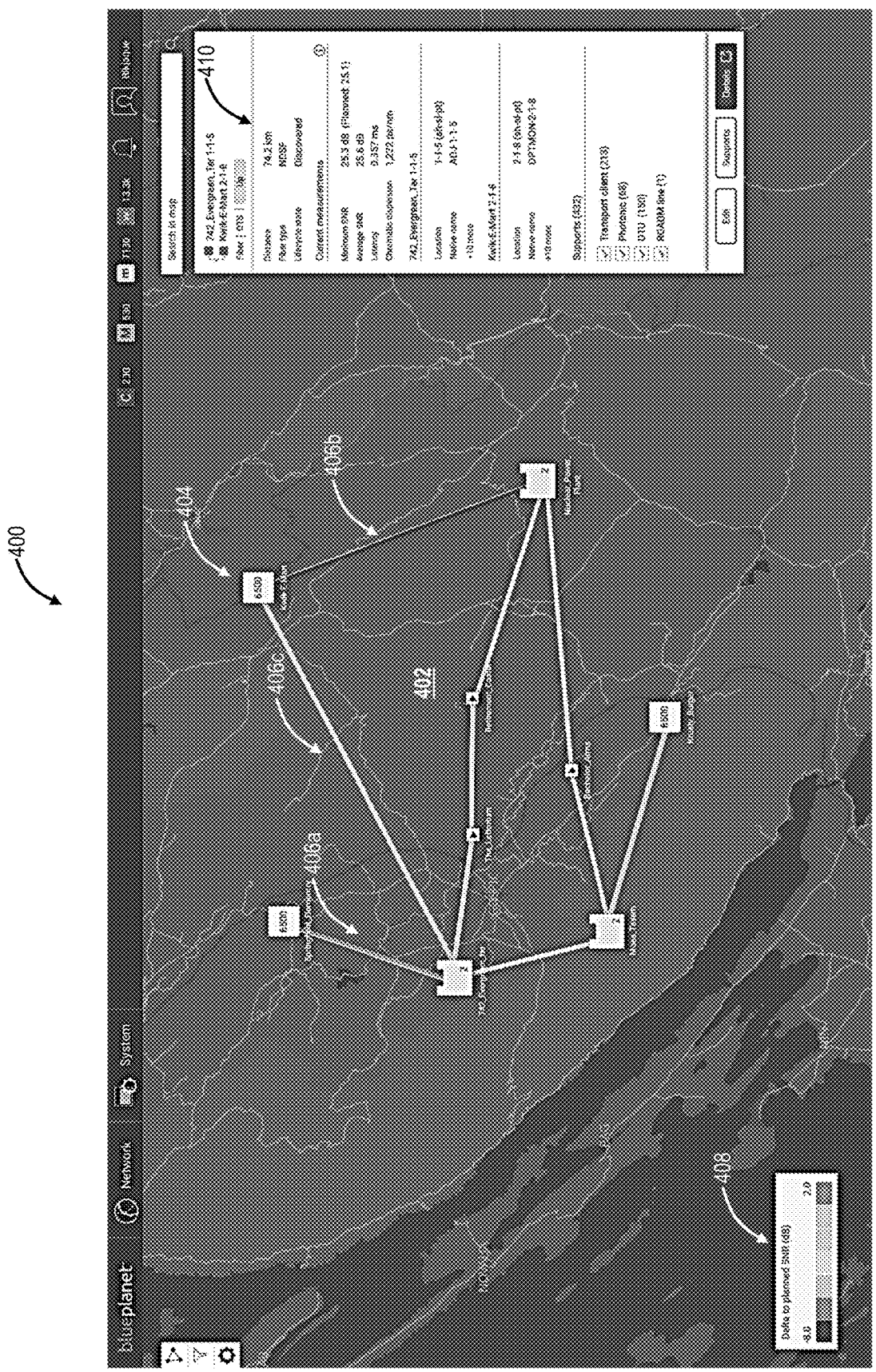
Figure 18:
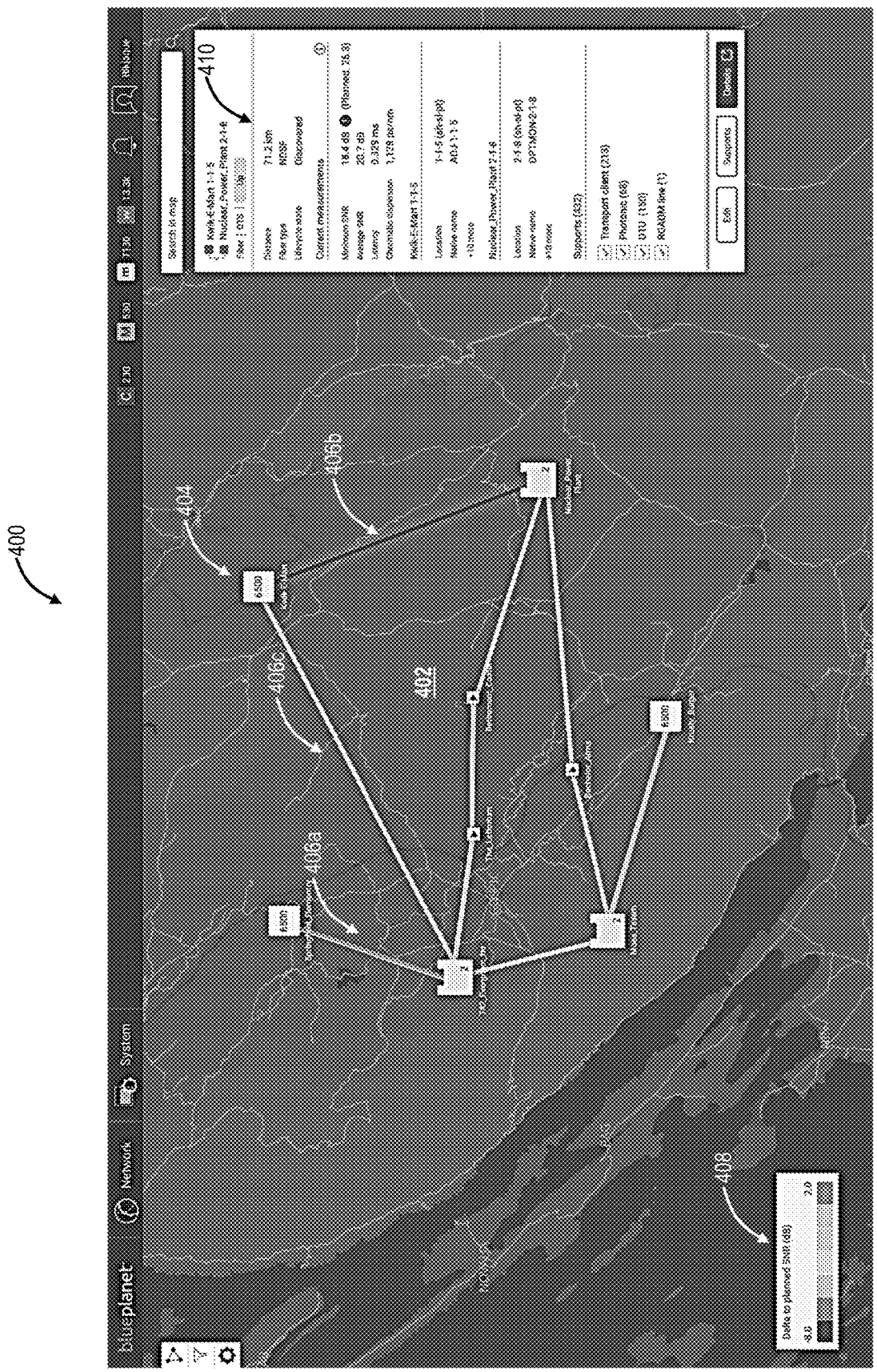

FIGS. 16-18 are screenshots of a fiber span performance map 400, illustrating various features. The fiber span performance map 400 includes a network map 402, which includes network elements 404, visualized as icons, and links 406 visualized as lines connecting the network elements 404. There are various other aspects, such as a geographic map in the background that can give an operator context, e.g., a particular network element 404 is located in a particular city or location, a particular link 406 traverses a set geography, etc. The fiber span performance map 400 can include a visual key 408, which provides some indication of the performance of a fiber link 406. In this example, the visual key 408 includes colors which change according to a range of delta to planned SNR (dB). For example, dark green can be +2.0, whereas dark red can be −8.0 with different shades in-between representing intermediate values. Of course, other types of visual indicators are contemplated, including different colors, icons, shading, cross-hatching, line weight, other line characteristics, fill, stroke, border, gradients etc.

Each link 406 can provide a visualization based on the visual key 408. For example, a link 406a may be overperforming and is thus green. Another link 406b may be underperforming and is thus red whereas another link 406c is neutral and is thus gray. In the example of FIG. 9, the link 406 is selected, and a summary info tab 410 is displayed. The tab 410 displays current measurements with better than planned (positive delta) SNR, namely 24.9 dB minimum SNR (relative to 23.3 dB planned) as well as an average SNR of 25.3 dB. Other measurements can include latency and chromatic dispersion.

FIG. 17 illustrates the selection of the link 406c and the summary info tab 410 displayed with its information. The tab 410 displays current measurements with values as planned (neutral delta) SNR, namely 25.3 dB minimum SNR (relative to 25.1 dB planned) as well as an average SNR of 25.6 dB. FIG. 18 illustrates the selection of the link 406b and the summary info tab 410 displayed with its information. The tab 410 displays current measurements with values worse than planned (neutral delta) SNR, namely 18.4 dB minimum SNR (relative to 26.3 dB planned) as well as an average SNR of 20.7 dB. Note, in each of FIGS. 16-18, the selected link 406 can include highlighting or some other visualization so that it stands apart from other links 406 so a user knows the summary info tab 410 is displaying information for that link 406.

Figure 19:
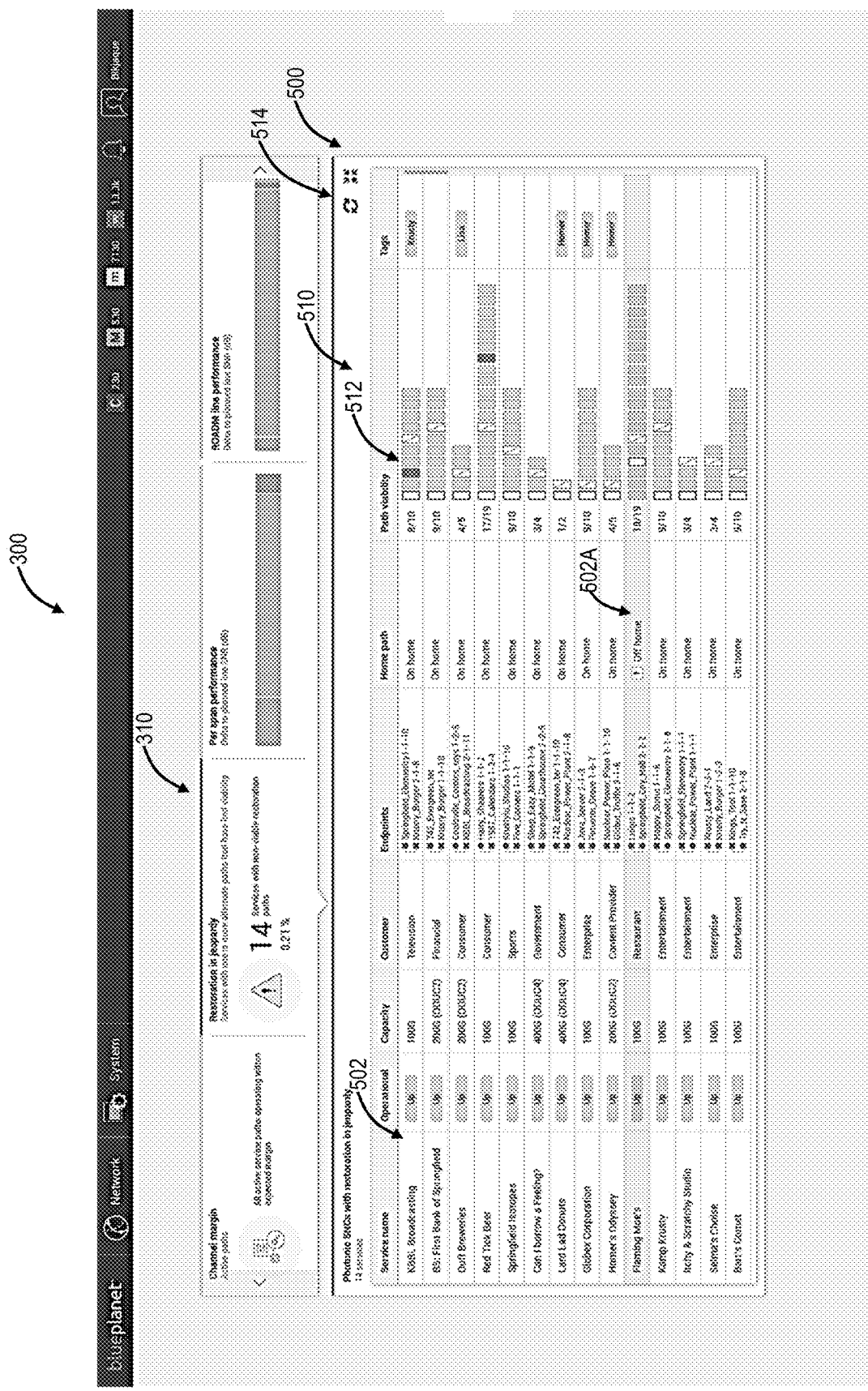
FIGS. 19 and 20 are screenshots illustrating expansion of he photonic performance dashboard illustrating a photonic service path viability visualization.
Figure 20:
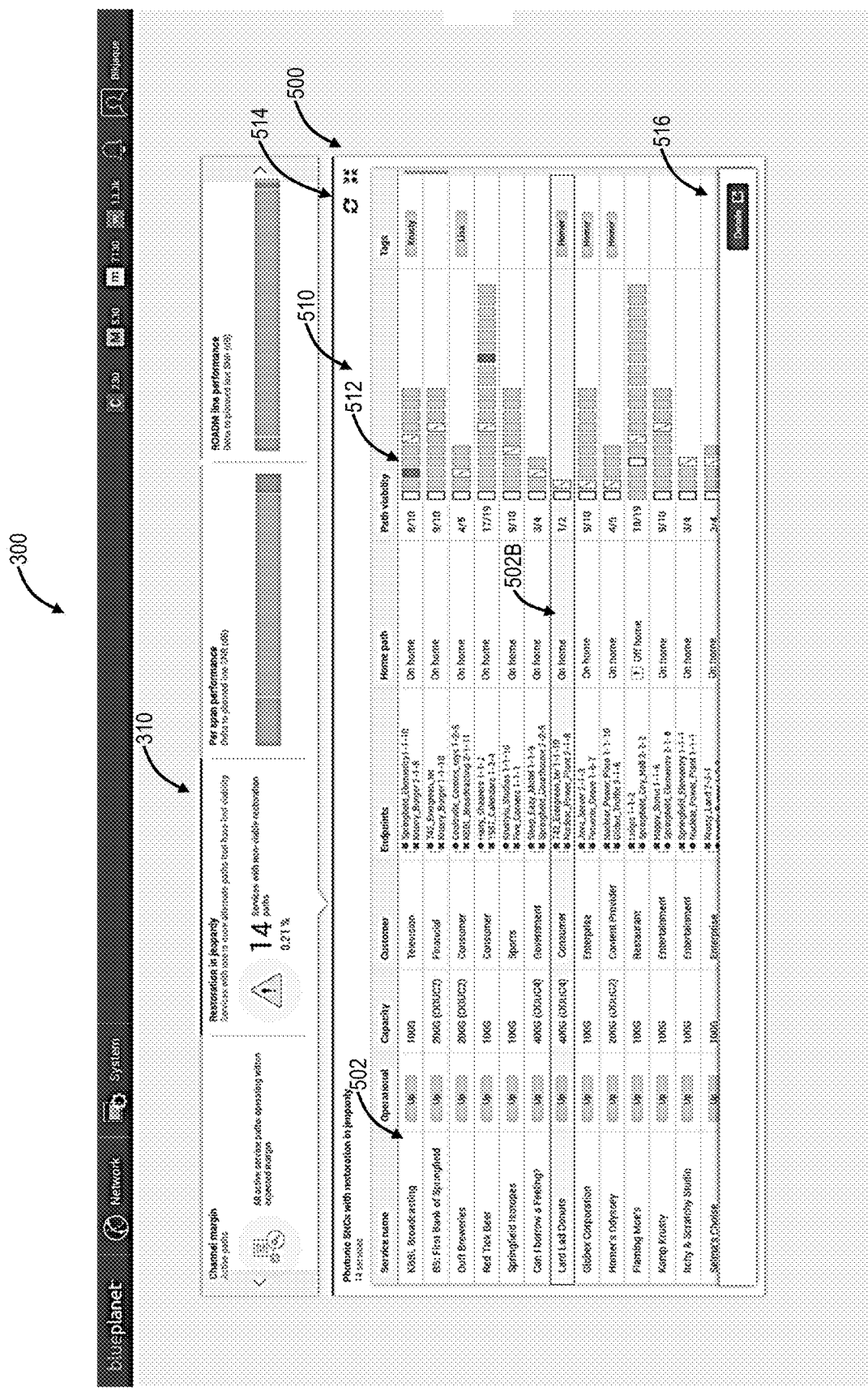

FIGS. 19 and 20 are screenshots illustrating the expansion of the photonic performance dashboard 300 illustrating a photonic service path viability visualization 500. For example, the photonic service path viability visualization 500 can be based on a selection, i.e., "drill-down," from the tile 310. The objective of the photonic service path viability visualization 500 is to present the health of optical services visually. The photonic service path viability visualization 500 is presented in a table or tabular format with a list of photonic services 502. Of course, other formats are contemplated. A photonic service 502 can be a Sub-network Connection (SNC) such as in ASON or OSRP, a Label Switched Path (LSP) such as in GMPLS or the like. The photonic service 502 is a Layer 0 service providing capacity in some amount between two endpoints (e.g., ingress and egress ROADM nodes).

FIGS. 19 and 20 are screenshots that result from clicking an "expand" icon 325 on visualization 316 "restoration in jeopardy" of the photonic performance data card 310 on dashboard 300. The basic idea is that all the details that are summarized on visualization 316 of data card 310 expand in place (replacing the dashboard). If the user chose to click the "expand" icon for the other visualizations on data card 310, namely 312 or 314, their associated details would be shown instead. Note, once a user has expanded visualization 316, they can quickly load any of the other visualization details from data card 310 by clicking along the top of the screen where the visualization summaries are presented. FIG. 19 shows "restoration in jeopardy," but a user can easily switch to "channel margin" details or "ROADM line performance" details by clicking their summary visualization across the top of the screen.

The list of photonic services 502 can include a service name, i.e., something meaningful to an operator enabling them to correlate the service to its owner. The list of photonic services 502 can include an operational status indicator, e.g., UP or DOWN. This operational status indicator indicates whether each service is up or not, and it can include colors, words, shading, etc. The list of photonic services 502 can also include a capacity indication (e.g., 100G, 200G, 400G, ODUC2, ODUC4, etc.), a customer indicator (e.g., television, financial, consumer, government, content provider, etc.), endpoints (e.g., ingress and egress ROADM nodes), etc. The list of photonic services 502 can also include a home path indicator and a path viability visualization 510.

In an embodiment, the photonic service path viability visualization 500 can be used to identify photonic services with restoration in jeopardy quickly. "Restoration in jeopardy" means that one or more next paths for the photonic service are experiencing problems, such as from an SNR margin perspective. A home path means a photonic service is on the originally provisioned primary paths. This can also be referred to as a working path, etc. That is, the home path is the original path, such as the optimal one (e.g., optimal is some sense such as minimal administrative weight, etc.). When a photonic service is off the home path, this means a switch has occurred where the photonic service has moved to an alternative path, for whatever reason, e.g., fault, maintenance, etc. A next path is an alternative path in the optical network 100 to route the photonic service between its endpoints. Generally, a photonic service should have one or more standby paths, i.e., non-home paths, protection paths, etc. The purpose of such standby paths is to restore the photonic service when a previous path, such as the home path, has issues, etc.

The present disclosure contemplates the processing device 200 implementing the photonic service path viability visualization 500 having access to or computing the possible standby paths as well as having the path viability performance, again either access to or computing the path viability performance. The possible standby paths are computed or known in advance, and such paths and the home path are ranked in order, starting with the home path, next is a first standby path, etc.

The path viability visualization 510 provides a quick and efficient visualization to display the status of each photonic service's home path and standby paths. The path viability visualization 510 includes a set of rectangles, where each rectangle represents an entire path (A to Z, where A and Z are the endpoint nodes) for that service to run on. Of course, other shapes or icon types are contemplated. The key here is there is one visual element 512 (here it is a rectangle) for each path, with the first visual element 512 being the home path, the second visual element 512 being the first standby path, etc. Next, each visual element 512 includes an indicator of the optical performance of that path, i.e., its path viability. The visual element 512 can indicate a viable path (such as a solid box in this example), a current path on which the photonic service is located (such as a border only in this example), a non-viable path based on measured SNR margin (such as a diagonal hash in the box in this example), and an unavailable path based on a fault, etc. (such as a solid red box in this example, or some other color).

Further, the visual elements 512 may disappear if that particular path no longer has the bandwidth available due to capacity changes in the network. Even further, the visual elements 512 can periodically change the indicator of the optical performance as updated measurements are determined, such as based on a refresh command 514, based on some time interval, etc. This is a real-time indicator. The visual elements 512 highlight performance on each path, such as pass/fail based on margin, as well as path availability. Also, those of ordinary skill in the art will recognize other types of visual indicators are contemplated consistent with the descriptions herein.

The advantage of the path viability visualization 510 is it provides a data in two dimensions in a convenient and efficient manner, namely a number of restoration paths—based on a number of the visual elements 510, and a state of the restoration paths—based on the indicators associated with each visual element 510. Thus, a quick glance indicates the state of the network 100 for any given service.

In FIG. 19, a service 502A is highlighted and off its home path. The service 502A has 19 possible paths, of which 18 are viable. In FIG. 20, a service 502B is highlighted and on its home path. However, the service 502B has only one standby (restoration) path, and it is not viable. The selection of the service 502B allows a user to see additional details (see next few slides) for the service when clicking on a box 516 titled 'Details.'

Figure 21:
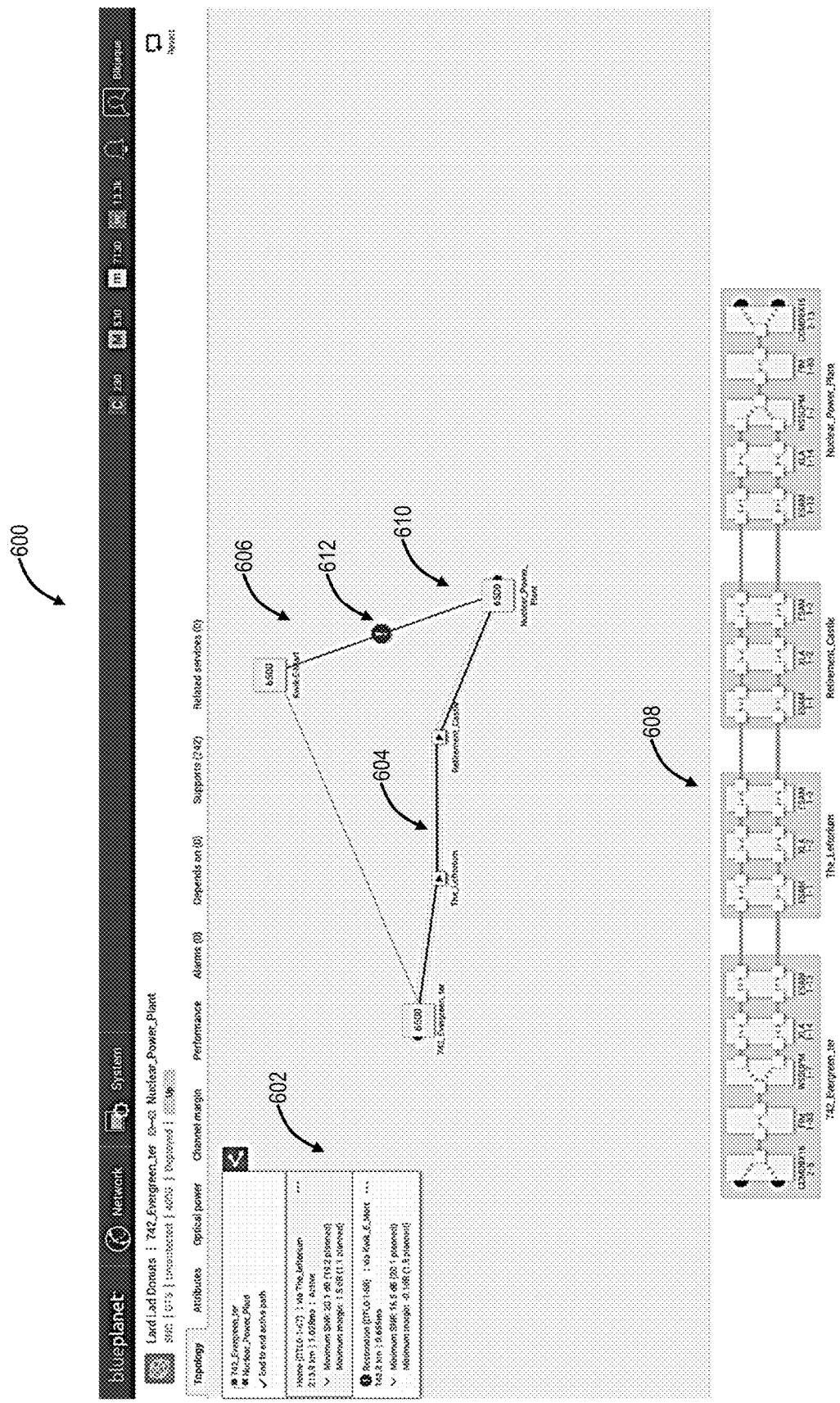
FIGS. 21, 22, and 23 are screenshots of a map and details of the photonic service selected in the path viability visualization of FIG. 20.
Figure 22:
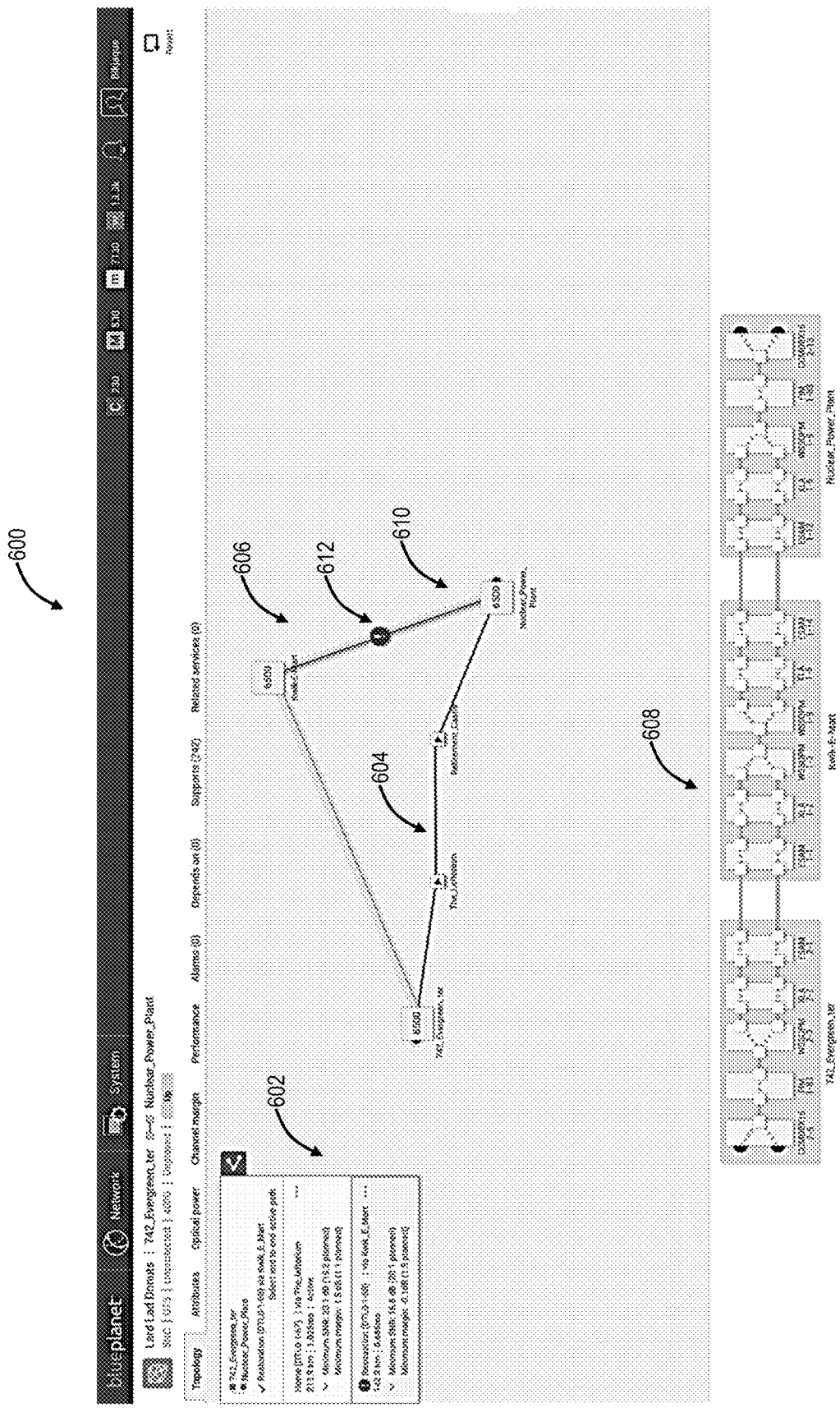
Figure 23:
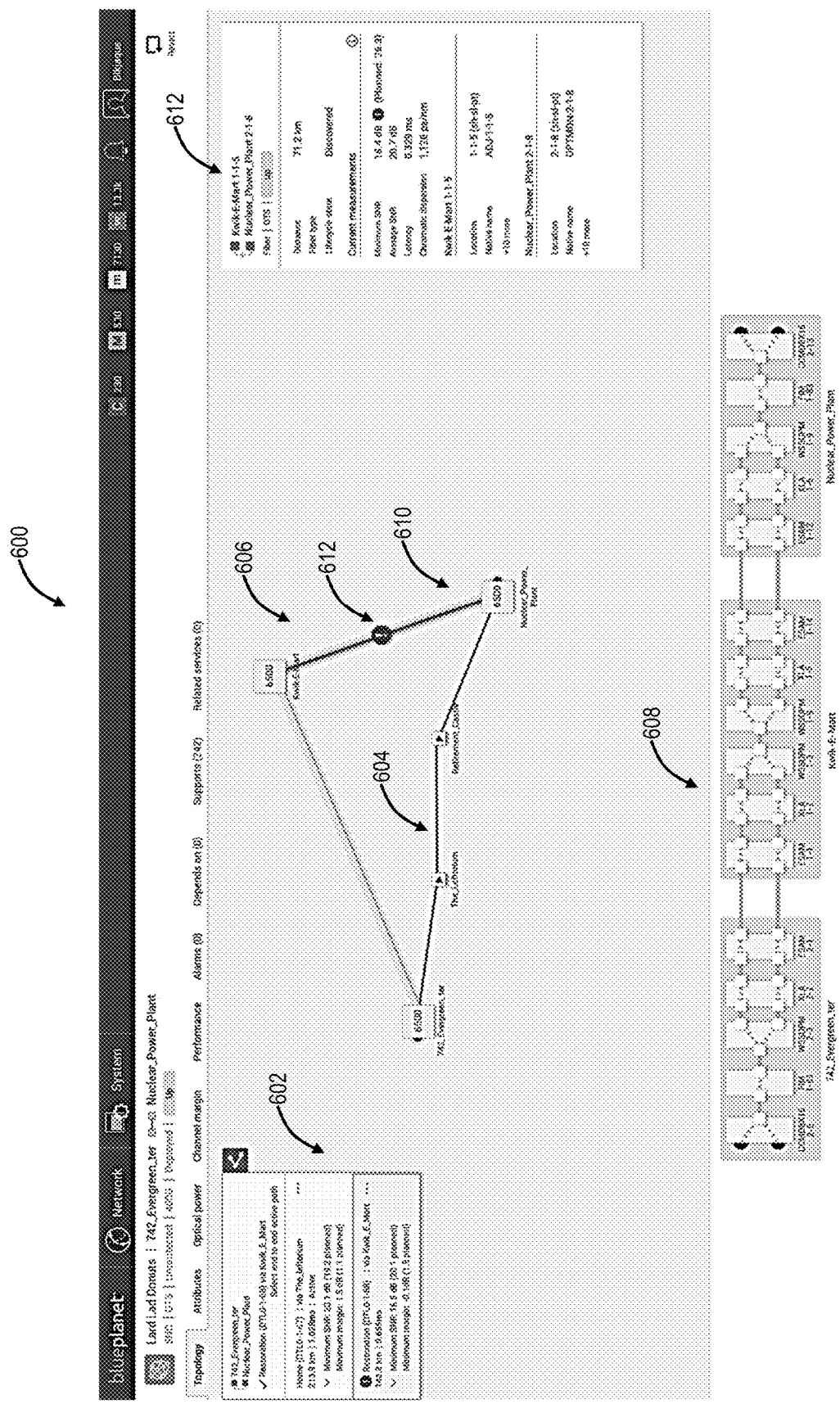

FIGS. 21, 22, and 23 are screenshots of a map 600 and details 602 of the photonic service 502B selected in the path viability visualization 510. Again, the photonic service 502B has two possible paths—its home path 604 and a standby path 606, which is not viable. In FIG. 14, the map 600 has the home path 604 highlighted and a subway map 608 visualizes the network elements associated with the home path 604, expanded to include the cards and ports the photonic service traverses. Here, the details 602 provide the details of both paths, and the highlight in the details indicates the home path 604. The standby path 606 has a link 610 with an indicator 612 visualizing the span presenting a problem for the standby path 606. Here, the indicator is a red circle with an exclamation point—any such indicator is contemplated.

In FIG. 22, the standby path 606 is selected, and the subway map 608 changes to the standby path 606, which is not viable, as noted in the details 602. In FIG. 23, a summary data info pod 612 is displayed after selecting the link 610 (or the indicator 612). The summary data info pod 612 displays the current measurements of the selected span. Similar to clicking on the service to display the route, it is possible to click on the span to see all the services with home and restoration paths that make use of that span. From there, the icon-based display of routes provides visibility, whether any services are impacted.

The icon itself can be 'clicked' to display the route that it represents. The spans of that route can then provide the graphical indication relative to plan as to how they are performing to help troubleshoot and localize the issue.

Where a photonic service, such as the photonic service 502B, is in jeopardy of not being able to restore, there can be a trigger to an application or user to recalculate the routes. A restoration path that degrades can otherwise represent a silent failure that is only discovered at the time of restoration.

The various indicators in FIGS. 16-23 can be based on incremental SNR. For example, the calculation can concatenate the absolute penalties of each section within the network to determine the total SNR penalty of a path (including modem implementation noise) and compare it with the required SNR of the modem to determine viability.

As described above, the same underperforming span can have different impacts on full paths, depending on how much margin is left. Note, it is possible that some spans that are performing better than expected can make up for ones that are not. When the user sees a span that is not providing the expected SNR, it may or may not be of consequence. By correlating that with the display of whether services are impacted provides input on classifying the severity of the issue and where best to 'roll trucks' to address the issues of consequence ('roll trucks' means visit the site for on-site maintenance).

§ 10.1 Process for Optical Path Visualization

Figure 24:
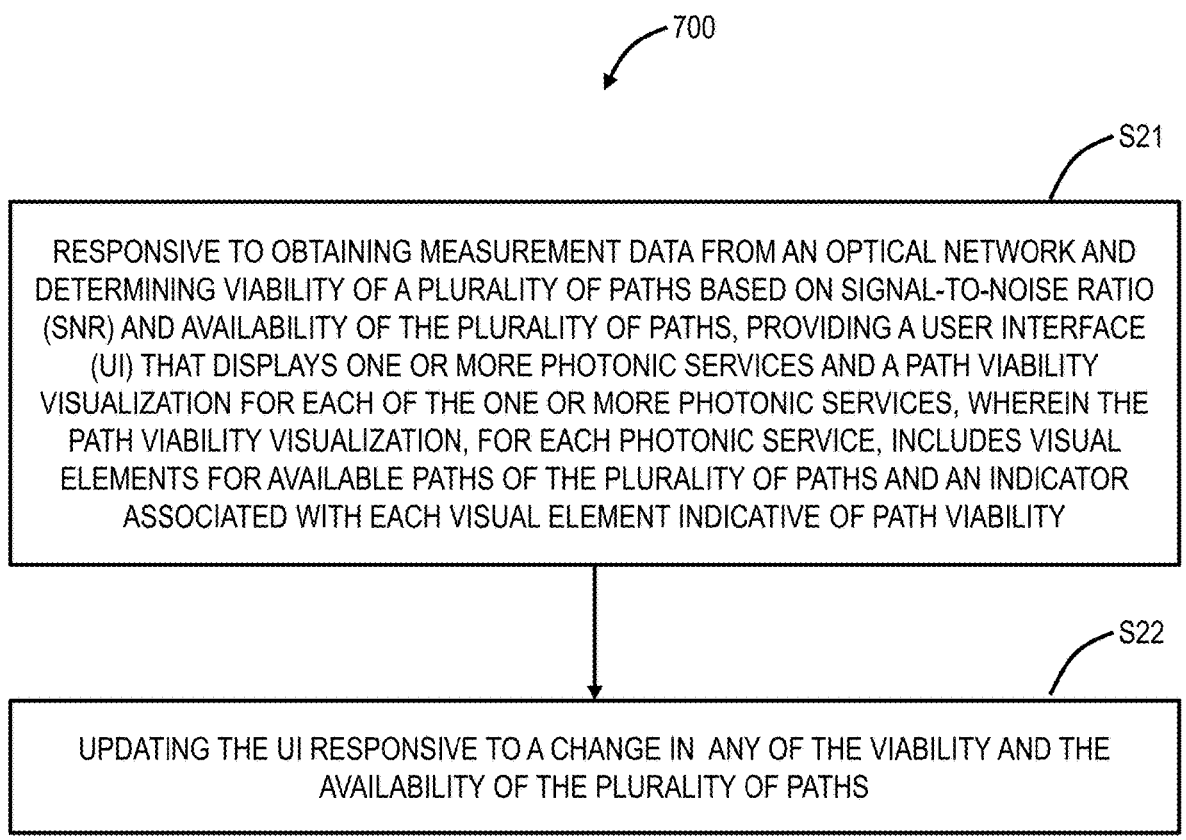
FIG. 24 is a flowchart of a process for optical path viability visualization.

FIG. 24 is a flowchart of a process 700 for optical path viability visualization. The process 700 can be a computer-implemented method, in a non-transitory computer-readable storage medium having computer readable code stored thereon for programming a processor to perform steps or via the processing device 200.

The process 700 includes, responsive to obtaining measurement data from an optical network and determining viability of a plurality of paths based on Signal-to-Noise Ratio (SNR) and availability of the plurality of paths, providing a User Interface (UI) that displays one or more photonic services and a path viability visualization for each of the one or more photonic services, wherein the path viability visualization, for each photonic service, includes visual elements for available paths of the plurality of paths and an indicator associated with each visual element indicative of path viability (step S21); and updating the UI responsive to a change in any of the viability and the availability of the plurality of paths (step S22).

The process 700 can further include periodically obtaining the measurement data from the optical network and determining the viability of the plurality of paths. The process 700 can further include providing a map view of all or part of the optical network, wherein the map view includes nodes and links interconnecting the nodes; and providing a visualization for each of the links based on a visual key, to indicate a level of the viability thereof. The process 700 can further include receiving a selection of a link; and displaying a summary of current measurement data associated with the link.

The viability is based on the SNR and whether the margin is available thereon, and the availability is based on whether the spectrum is available. The indicator associated with each visual element indicative of path viability indicates any of viable, unavailable, current where the photonic service is using an associated path, and non-viable. The viability of the plurality of paths based on the SNR can utilize an incremental SNR computation. The available paths, for a photonic service, can include a home path and zero or more standby paths, with a number of visual elements indicating the number of the zero or more standby paths.

§ 10.2 Other Algorithms

Of note, the approach described herein is excellent for real-time computation. Also, there are numerous propagation processes that would address the incoherent (directly incremental) and coherent effects of a fiber that could be utilized to model propagation behavior including nonlinearities, in order from most pragmatic to least pragmatic (the latter 3, and especially latter 2 methods are typically only reserved for much more complicated devices than simple, low-index contrast waveguides such as optical fibers): Split-step Fourier method (SSFM), Beam propagation method (BPM), Finite element method (FEM), Finite-difference time-domain (FDTD) method, and the like.

§ 11.0 Improve Physical Layer Modeling Through Aggregation of Network Element Calibration Parameters and Parameterized Behavioral Models As described herein, factory calibration data can be used in the various computations, that is many applications use generic calibration parameters or possibly parameters provided by a manufacturer that utilize a statistical representation of an ensemble of network elements (for example using averaged values, or values representing a certain part of the distribution of manufactured cards). Parameter variation between amplifiers or other modules can be significant and failure to account for it places limits on the achievable accuracy of a propagation model. It is typical for a systems integrator to package and re-sell amplifier modules from multiple manufacturers under the same product. There can be material performance differences between different modules.

Network Management Systems and the like can combine network telemetry with factory calibration data for individual network elements to estimate the linear and nonlinear noise that a channel would experience propagating through a fiber optic link.

Much attention is paid to nonlinear noise sources, but the linear amplified spontaneous emission (ASE) noise from amplifiers typically represents the dominant noise contribution by more than a factor of two to one. Accurate modeling of ASE noise in telecommunication links requires sophisticated amplifier models which depend on calibrated amplifier parameters (which vary card-to-card) as well as the details of the amplifier operating mode. Furthermore, the ability to model an ensembled concatenation of elements, including fibers, also requires the capability to accurately model the gain blocks of the amplifiers which can rely on a subset of the same calibrated set of parameters.

In an embodiment, each module can include detailed factory calibration measurements on a per-card basis to enable accurate modeling of the gain and noise transfer functions at any operating point. This set of calibration data can include noise figure (NF), dynamic gain tilt (DGT), and gain ripple which can be measured as a function of various dimensions each (e.g.: frequency, gain mode, gain tilt, input power, output power, total output power offset, etc.). This amplifier factory calibration data for each amplifier can be transmitted through a northbound interface (NBI) of customer networks to enable noise calculations at the orchestration level. As is known in the art, a northbound interface is a data connection from a network element to a management system.

There has been a lot of work from third parties to develop propagation modeling tools such as GNPy, which is an open-source model available online at gnpy.readthedocs.io/en/master/. Of note, the dominant error source in such models is inaccuracy in knowledge of one or more operation points of the network elements; for example: the amplifiers. This modeling requires proprietary data such as amplifier gain profiles and noise figures. Of note, amplifiers can be calibrated in the factory and detailed parameters can be stored in each amplifier's card calibration table (CCT). This data can be exposed to a management system.

The external SNR is the SNR on the symbols received by a modem after removing noise contributions from the receiver and transmitter. Accurate calculation of the external SNR requires communication of modem calibration parameters from the receiver as well as the transmitter to the place where the calculation is performed. The concatenation of incremental SNR contributions from the line system may be used to determine the external SNR without requiring direct measurement with modems. In this case, accuracy may be improved through the inclusion of amplifier calibration parameters in the external SNR calculation.

The present disclosure can include calculating the noise in one or more spans of an optical telecommunications network using a central controller that coordinates, and optionally performs the calculation. This calculation may include parameters extracted from one or more amplifiers or other network elements. Parameters may include discrete values, parameterized curves, look up tables, algorithms, equations etc. The parameters may be used to improve the accuracy of the calculation, and the parameter can be calibration data or the like that are stored within an amplifiers or other network elements firmware or in any other type of memory (such as non-volatile memory that can be read or written by the firmware) during manufacture. Of note, the calibration parameters can be transmitted through a northbound interface to the central controller where they are aggregated for use in the calculation.

For amplifiers, the parameters can include one or more of the amplifier gain, noise figure, gain ripple, dynamic gain tilt as well as the relationship between those parameters and their sensitivity to operating condition. Examples include the variation of noise figure with gain as well as the wavelength dependence of the gain for a given operating condition. Parameters may also include the presence of special features such as the use of pulse width modulation on the amplifier pump lasers and the modulation parameters that are currently in use. The elements may include an EDFA, Raman gain amplifier, or other device such as a WSS, optical filter module, etc.

The parameters can be determined out of service as part of a calibration procedure and stored in the network element, card, module, or sub-assembly. An example of this would be factory calibration of amplifiers and storage of parameters in the amplifier CCT.

The parameters are transmitted to the central controller through a northbound interface using one or more communications protocols such as NETCONF, RESTCONF, Transaction Language 1 (TL1), Simple Network Management Protocol (SNMP), gNMI, and the like. Industry standards such as the YANG model as defined by groups such as the Open Networking Foundation, OpenConfig and Open-ROADM are adapted to include support for the northbound transmission of calibration parameters.

In an embodiment, sensitivity (parameterized) curves are transmitted through the northbound interface to enable a noise calculation. The noise or other calculation is performed within a network controller, NMS, EMS, etc. Also, the parameters can be aggregated by a network controller (e.g., SDN) and transmitted to some other device for further processing.

Amplifiers are calibrated in the factory and the calibration parameters are stored in each amplifiers CCT. A noise calculation is requested for a given portion of a network. The central controller determines the relevant topology and the set of network elements that are present along the path. The network controller determines which parameterized curves, or portions thereof, are required for the calculation and polls the network elements through the northbound interface to request the required data. Firmware in each network element locates the required data and returns it to the controller in response to the request. Logic contained within the network controller or on the network element may handle cases where data is not available by substituting the best available data from other sources. The controller may also report the additional uncertainty in the calculated result that is anticipated as a result of the substitution. The noise calculation is performed within the controller and the results are returned to the process or user that initiated the request. In another embodiment, a controller can send a calculation procedure to the network element which performs the calculation using the calibration data and returns a result to the controller.

Of note, there are existing approaches that suggest storing calibration data in modules, such as in commonly-assigned U.S. Pat. No. 8,233,215, the contents of which are incorporated by reference. The approach herein contemplates taking this data from a module, through the network element, to a central controller, where it can be used to improve the accuracy of a noise or other calculation. The present disclosure includes taking the aggregate, and possibly post processed, data from the host (amplifier assembly) and transmitting it to a central controller.

§ 12.0 Conclusion

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the claims.

What is claimed is:

1. A non-transitory computer-readable medium comprising instructions that, when executed, cause one or more processors to perform steps of:
receiving data for a plurality of elements associated with an optical network and receiving calibration data associated with one or more of the plurality of elements, the received calibration data is received via a northbound interface;
determining an incremental noise penalty for each element of the plurality of elements based on the received data and the received calibration data; and
storing the incremental noise penalty for each element of the plurality of elements.

2. The non-transitory computer-readable medium of claim 1, wherein the steps further include
determining Signal-to-Noise Ratio (SNR) across an optical path in the optical network by concatenating associated incremental noise penalties for each element in the optical path along with corrections.

3. The non-transitory computer-readable medium of claim 2, wherein the corrections are for upstream incremental noise penalties for elements upstream from the associated element.

4. The non-transitory computer-readable medium of claim 2, wherein the SNR is determined in real-time based on utilizing stored incremental noise penalties.

5. The non-transitory computer-readable medium of claim 2, wherein the steps further include
utilizing the SNR for the optical path as a cost metric in path computation.

6. The non-transitory computer-readable medium of claim 2, wherein the steps further include
utilizing the SNR for the optical path to determine if any of a pre-planned restoration route for an optical channel and a new route for a new optical channel is currently viable.

7. The non-transitory computer-readable medium of claim 1, wherein the steps further include
identifying sections in the optical network that need maintenance or repair based on monitoring associated incremental noise penalties.

8. The non-transitory computer-readable medium of claim 1, wherein the steps further include
periodically performing the receiving, the determining, and the storing; and monitoring the associated incremental noise penalties over time.

9. The non-transitory computer-readable medium of claim 1, wherein the incremental noise penalty is a Noise-to-Signal Ratio (NSR) for each element of the plurality of elements.

10. The non-transitory computer-readable medium of claim 9, wherein noise from upstream elements changes the incremental noise penalty of downstream elements.

11. The non-transitory computer-readable medium of claim 1, wherein the incremental noise penalty is a combination of noise figure (NF) and gain or loss for each element of the plurality of elements.

12. The non-transitory computer-readable medium of claim 1, wherein the steps further include
determining performance costs in routing, modulation, and spectral assignment (RMSA) algorithms.

13. The non-transitory computer-readable medium of claim 1, wherein the steps further include
utilizing the stored incremental noise penalties for any of raising alarms and recomputing routes to replace non-viable routes with viable routes.

14. The non-transitory computer-readable medium of claim 1, wherein at least one of the plurality of elements is an optical amplifier.

15. A processing device comprising:
one or more processors and memory comprising instructions that, when executed, cause the one or more processors to
receive data for a plurality of elements associated with an optical network and receive calibration data associated with one or more of the plurality of elements, the received calibration data is received via a northbound interface,
determine an incremental noise penalty for each element of the plurality of elements based on the received data and the received calibration data, and
store the incremental noise penalty for each element of the plurality of elements.

16. The processing device of claim 15, wherein the instructions that, when executed, further cause the one or more processors to
  determine Signal-to-Noise Ratio (SNR) across an optical path in the optical network by concatenating associated incremental noise penalties for each element in the optical path along with corrections.

17. The processing device of claim 15, wherein the instructions that, when executed, further cause the one or more processors to
  identify sections in the optical network that need maintenance or repair based on monitoring associated incremental noise penalties.

18. The processing device of claim 15, wherein the incremental noise penalty is one of
  a Noise-to-Signal Ratio (NSR) for each element of the plurality of elements, and
  a combination of noise figure (NF) and gain or loss for each element of the plurality of elements.

19. A method comprising steps of:
  receiving data for a plurality of elements associated with an optical network and receiving calibration data associated with one or more of the plurality of elements, the received calibration data is received via a northbound interface;
  determining an incremental noise penalty for each element of the plurality of elements based on the received data and the received calibration data; and
  storing the incremental noise penalty for each element of the plurality of elements.

20. The method of claim 19, wherein the steps further include
  determining Signal-to-Noise Ratio (SNR) across an optical path in the optical network by concatenating associated incremental noise penalties for each element in the optical path along with corrections.

* * * * *